United States Patent
Maeda et al.

(10) Patent No.: US 7,409,017 B2
(45) Date of Patent: Aug. 5, 2008

(54) SIGNAL SEPARATOR

(75) Inventors: Koji Maeda, Yokosuka (JP); Satoru Fukumoto, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 497 days.

(21) Appl. No.: 11/046,841

(22) Filed: Feb. 1, 2005

(65) Prior Publication Data

US 2005/0195922 A1  Sep. 8, 2005

(30) Foreign Application Priority Data

Feb. 3, 2004 (JP) .............................. 2004-027279
Apr. 30, 2004 (JP) .............................. 2004-136663

(51) Int. Cl.
*H03D 1/00* (2006.01)

(52) U.S. Cl. ...................................... 375/341

(58) Field of Classification Search ................. 375/144, 375/147, 148, 260, 262, 265, 340, 341; 370/335, 370/342
See application file for complete search history.

(56) References Cited

U.S. PATENT DOCUMENTS

| | | | | |
|---|---|---|---|---|
| 5,202,903 | A | * | 4/1993 | Okanoue ................... 375/347 |
| 6,028,901 | A | * | 2/2000 | Huynh et al. ............... 375/350 |
| 6,243,412 | B1 | * | 6/2001 | Fukawa ...................... 375/219 |
| 6,975,672 | B2 | * | 12/2005 | Bottomley et al. .......... 375/148 |
| 6,977,977 | B1 | * | 12/2005 | Dubrovin et al. ............ 375/346 |
| 7,218,666 | B2 | * | 5/2007 | Baum et al. ................. 375/148 |

FOREIGN PATENT DOCUMENTS

| | | |
|---|---|---|
| JP | 10-178373 | 6/1998 |
| JP | 11-251959 | 9/1999 |

OTHER PUBLICATIONS

Carl S. Wijting, et al., "Groupwise Serial Multiuser Detectors for Multirate DS-CDMA", Vehicular Technology Conference IEEE, vol. 1, XP-010341886, May 16, 1999, pp. 836-840.

* cited by examiner

*Primary Examiner*—Young T. Tse
(74) *Attorney, Agent, or Firm*—Oblon, Spivak, McClelland, Maier & Neustadt, P.C.

(57) ABSTRACT

A signal separator for separating multiple signals contained in a received signal from each other based on a replica of the received signal is provided. The signal separator comprises a sampling unit configured to sample the received signal at a prescribed sampling timing; an index output unit configured to monitor sampling counts of the sampling unit and output an index signal representing a remainder of a division dividing the sampling counts by a sampling number per a prescribed time period to group the sampled signals; a coefficient-variable filter configured to generate and output a replica of the received signal based on a channel estimation value and a signal point candidate, at least one of the channel estimation value and the signal point candidate being generated according to the index signal; a subtractor configured to subtract the replica from the sampled signal and output a subtraction result as a residual signal; and a maximum likelihood sequence estimator configured to estimate a sequence for each of the multiple signals based on the residual signal, taking into account signal state transition, and output the estimation result at a signal output timing determined by the index signal.

14 Claims, 20 Drawing Sheets

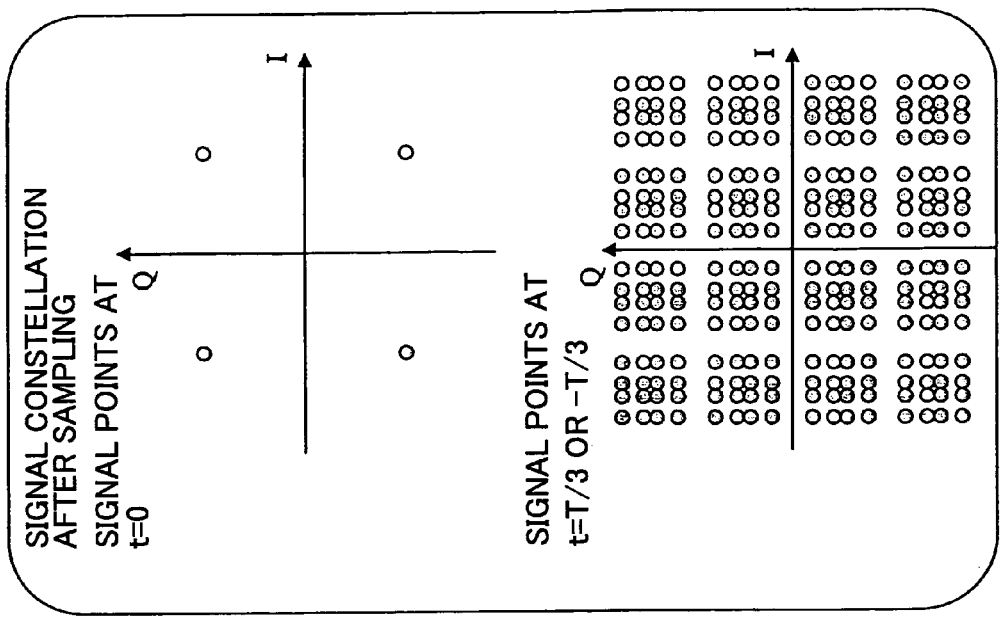
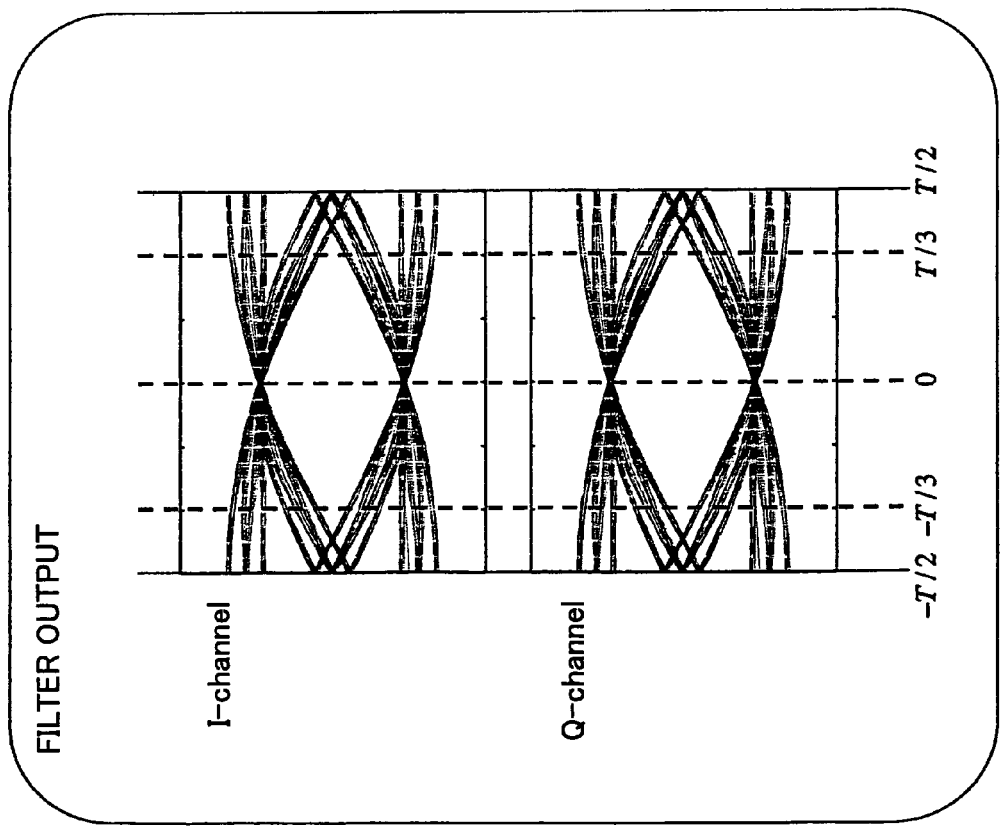

FIG.18 n2=n1 mod k (k IS THE NUMBER OF SAMPLING IN A PRESCRIBED TIME)

- 13 INDEX OUTPUT UNIT
- 14 SIGNAL GENERATOR A (SIGNAL 1) — SIGNAL POINT CANDIDATES FOR SIGNAL 1
- 15 SIGNAL GENERATOR B (SIGNAL 2) — SIGNAL POINT CANDIDATES FOR SIGNAL 2
- 16 COEFFICIENT VARIABLE FILTER A (SIGNAL 1) — CHANNEL ESTIMATION VALUE
- 17 COEFFICIENT VARIABLE FILTER B (SIGNAL 2)
- 20 CHANNEL ESTIMATOR
- 18 (REPLICA OF SIGNAL 2, REPLICA OF SIGNAL 1)
- 19 REPLICA OF RECEIVED SIGNAL
- 11 SAMPLING UNIT — SAMPLED SIGNAL, SAMPLING TIMING, SAMPLING NUMBER (n1)
- 12 SAMPLING CONTROLLER — SYMBOL RATE (SIGNAL 1) (SIGNAL 2)
- 21 MULTIPLIER (| |²) — RESIDUAL SIGNAL
- 220 WEIGHTING FACTOR CONTROLLER
- 221
- 22 MAXIMUM LIKELIHOOD SEQUENCE ESTIMATOR — ESTIMATION RESULT FOR SIGNALS 1 & 2
- 5
- INPUT SIGNAL

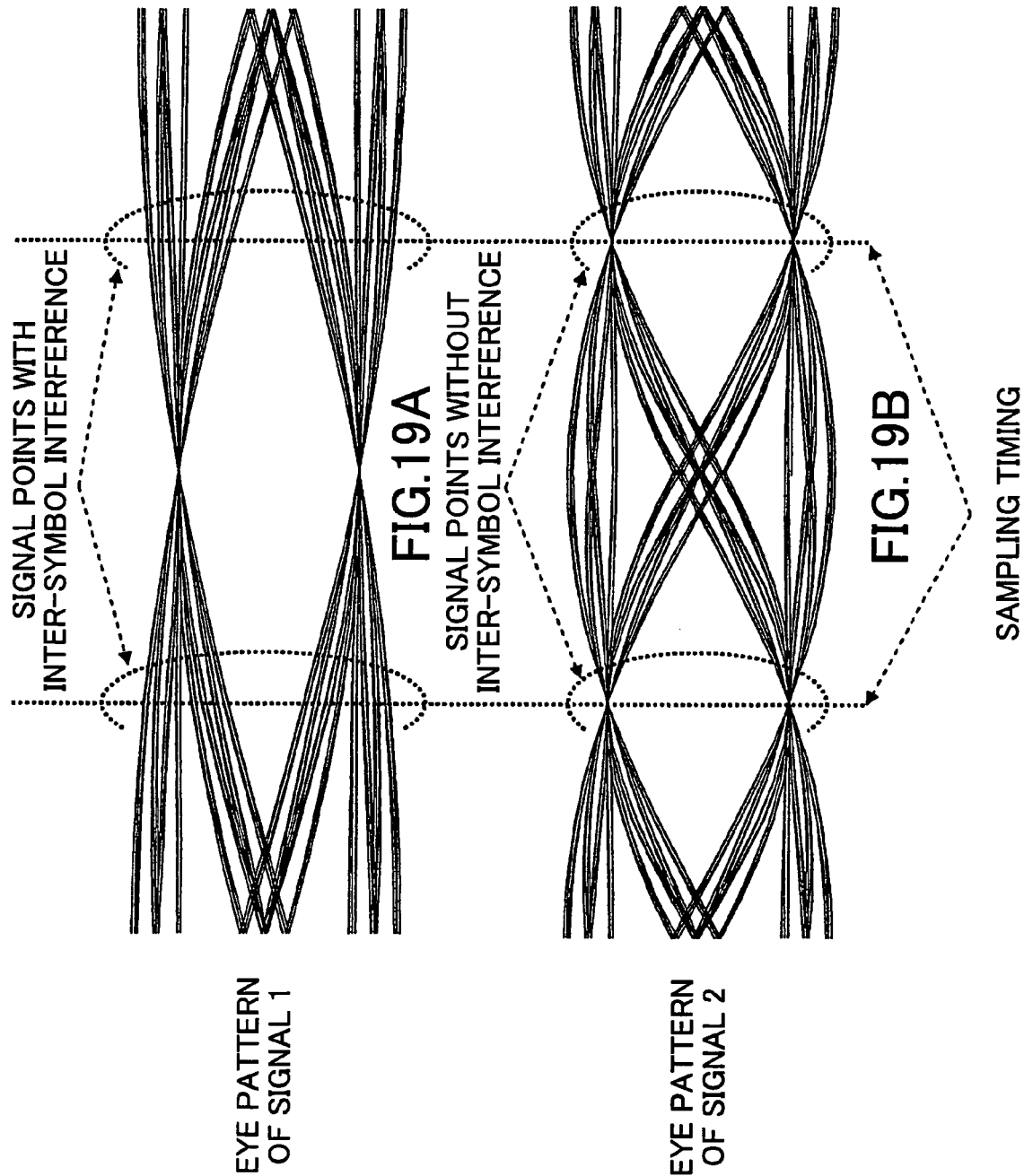

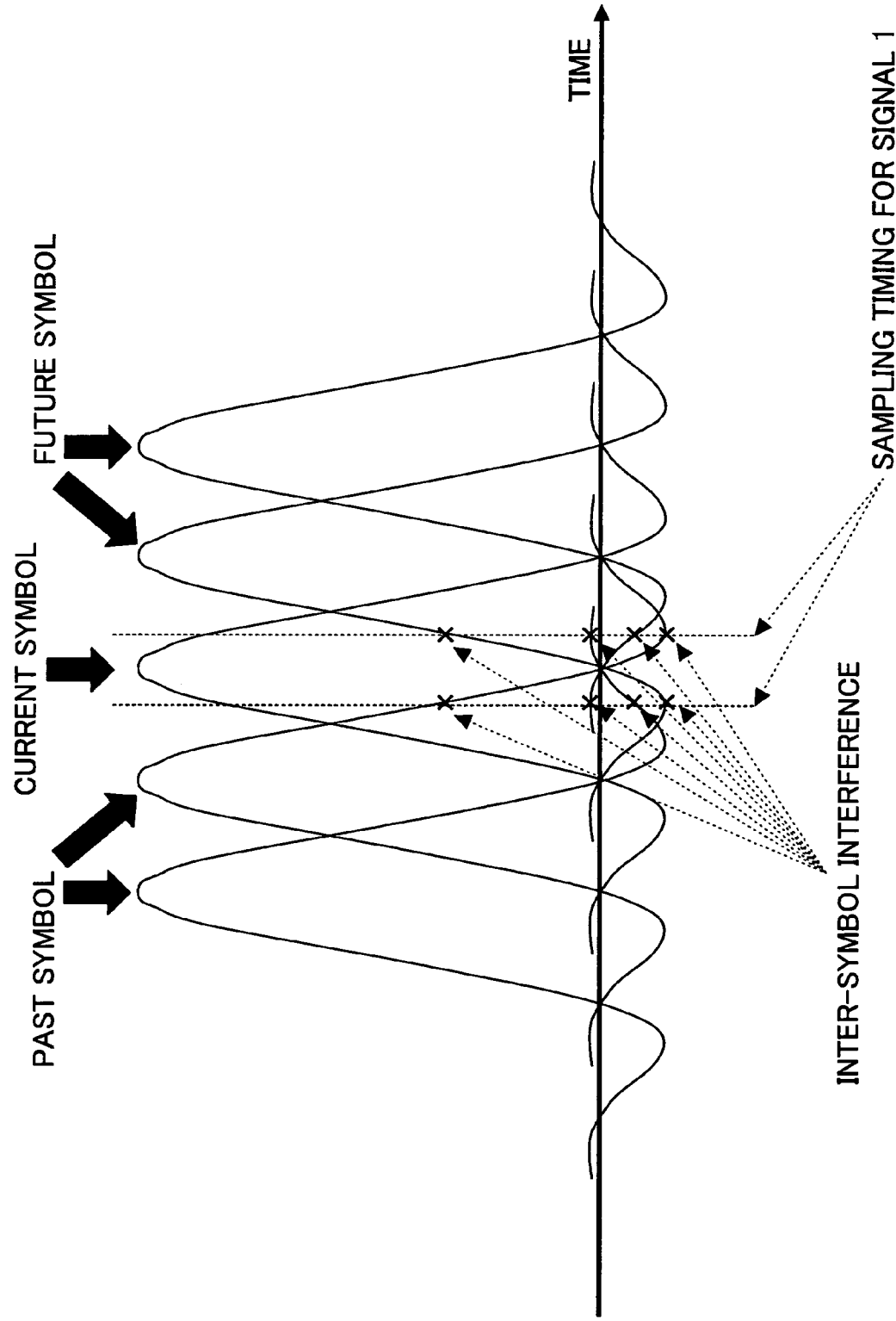

1

SIGNAL SEPARATOR

FIELD OF THE INVENTION

The present invention relates to a signal separator used in a wireless receiver.

BACKGROUND OF THE INVENTION

It is desired for wireless communication systems to allow as many signals as possible to be transmitted at the same frequency from the viewpoint of efficient use of limited frequency resources. Many researches and development have been made of interference cancellers for this purpose. In fact, interference cancellation is attracting attention as a technique that can increase system capacity.

FIG. 1 is a block diagram of a conventional interference canceller 300, which is generally installed in a receiver in a wireless communications system. This type of interference canceller is called a replica generation type interference canceller because it generates a replica of the received signal and separates a desired wave from other signals (interference waves).

In operation of the conventional replica generation type interference canceller, the channel estimator 318 estimates the level fluctuation and phase rotation in the channels of the desired wave and the interference wave. The coefficient-variable filters 314 and 315 generate desired signal replicas and interference signal replicas, respectively, for all possible candidates of symbol sequence. Each of the desired signal replica and the interference signal replica can be generated by calculating convolution of every possible candidate of the symbol sequence and the estimated channel value. The adder 316 adds one of the desired signal replicas to one of the interference signal replicas to produce a set of received signal replicas. The maximum likelihood sequence estimator 320 determines a pair of symbol sequence candidates of the desired signal and the interference signal that provide the received signal replica closest to the actually received signal. The maximum likelihood sequence estimator 320 outputs the symbol sequence candidate of the desired wave as the determination result, thereby removing the interference.

By removing the interference signal from the received signal in an adaptive manner, multiple signals can be transmitted at the same time at the same frequency, and the frequency utilization efficiency is improved.

An interference canceller used in a multi-rate transmission system is also proposed in, for example, Japanese Patent Laid-Open Publication No. 11-251959A. In this publication, signals are received at an array antenna in a DS-CDMA system using both a high-speed channel with a high transmission rate and a low-speed channel with a low transmission rate. An array antenna interference replica generation unit is provided to generate an interference replica of the high-speed channel for the purposes of removing the interference due to the high-speed channel from the received signal, and of improving the transmission quality of the low-speed channel.

The conventional interference canceller of the replica generation type can remove interference by generating replicas of the desired signal and the interference signal. However, since the conventional technique is based on the assumption that the band widths of the desired wave and the interference wave are the same, sufficient effect of interference cancellation cannot be achieved if a desired wave requiring a wide band and an interference wave expecting a narrow band are combined to form the received signal. To maintain the frequency utilization efficiency of the interference canceller of replica generation type, combinations of a wide-band signal and a narrowband signal have to be avoided at the same frequency.

SUMMARY OF THE INVENTION

The present invention is conceived in view of the above-described problems, and it is an object of the present invention to provide a signal separator that functions in the circumstances where wide-band signals and narrowband signals coexist at the same frequency, and can remove an interference wave with a bandwidth different from the desired signal.

To achieve the object, a signal separator for separating multiple signals contained in a received signal from each other based on a replica of the received signal is provided. The signal separator comprises:

(a) a sampling unit configured to sample the received signal at a prescribed sampling timing;

(b) an index output unit configured to monitor sampling counts of the sampling unit and outputs an index signal representing a remainder of a division dividing the sampling counts by a sampling number per a prescribed time period to group the sampled signals;

(c) a coefficient-variable filter configured to generate and output a replica of the received signal based on a channel estimation value and a signal point candidate, at least one of the channel estimation value and the signal point candidate being generated according to the index signal;

(d) a subtractor configured to subtract the replica from the sampled signal and output a subtraction result as a residual signal; and (e) a maximum likelihood sequence estimator configured to estimate a sequence for each of the multiple signals based on the residual signal, taking into account signal state transition, and output the estimation result at signal output timing determined by the index signal.

With this structure, the signal sequence of the transmitted signal is estimated accurately because the replica is generated for each group of the sampled signal designated by the index signal, preventing degradation of replica generating accuracy due to variation in possible signal points depending on different sampling timing.

In a preferred example, the signal separator further comprises:

(f) a channel estimator configured to estimate level fluctuation and phase rotation for each of the multiple signals in the received signal to produce the channel estimation value; and (g) a signal generator provided for each of the multiple signals and configured to output a signal point candidate of the associated multiple signals in a signal space, corresponding to a value of the index signal.

With this arrangement, the signal point candidate is generated for each group of sampled signals, and the replica is generated using the signal point candidate according to the index value and the channel estimation value.

In another preferred example, the signal separator further comprises:

(f) a channel estimator configured to estimate level fluctuation and phase rotation for each of the multiple signals in the received signal to produce the estimated channel value according to a value of the index signal; and (g) a signal generator provided for each of the multiple signals and configured to output a signal point candidate of the associated one of the multiple signals in a signal space.

With this arrangement, the estimated channel value is generated for each group of sampled signals, and the replica is generated using the channel estimation value produced according to the index value and the signal point candidate.

BRIEF DESCRIPTION OF THE DRAWINGS

Other objects, features, and advantages of the invention will become more apparent from the following detailed description when read in conjunction with the accompanying drawings, in which

FIG. 9A and FIG. 9B illustrate filter output and signal constellation, respectively, obtained from the signal generator shown in FIG. 7B;

FIG. 18 is a block diagram of a signal separator according to the fifth embodiment of the invention;

FIG. 19 is a diagram illustrating sampling timing with and without inter-symbol interference; and FIG. 20 is a diagram illustrating the condition of signal 1 subjected to inter-symbol interference.

DETAILED DESCRIPTION OF THE PREFERRED EMBODIMENT

Figure 1:
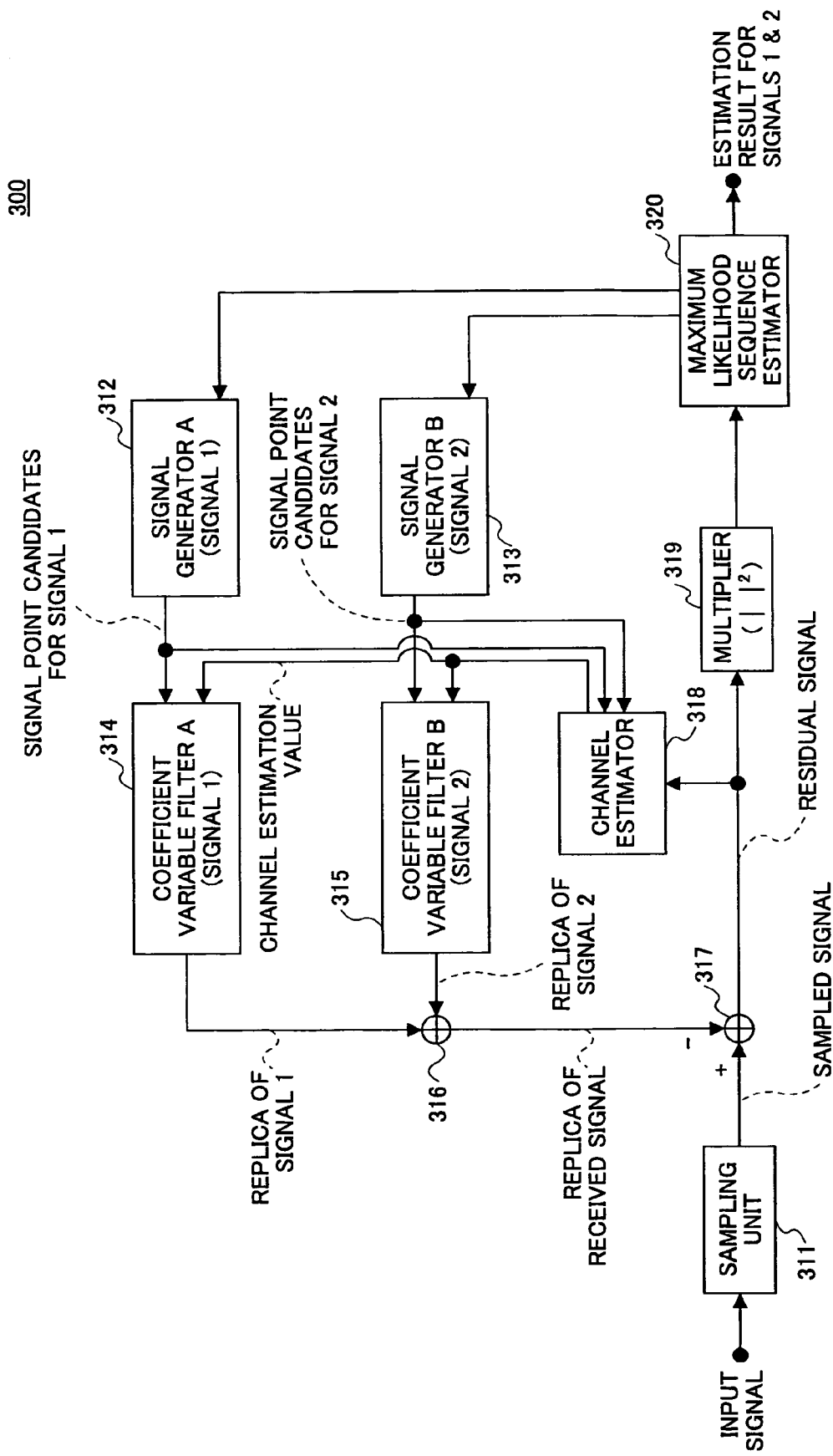
FIG. 1 is a block diagram of a conventional interference canceller of a replica generation type.
Figure 2:
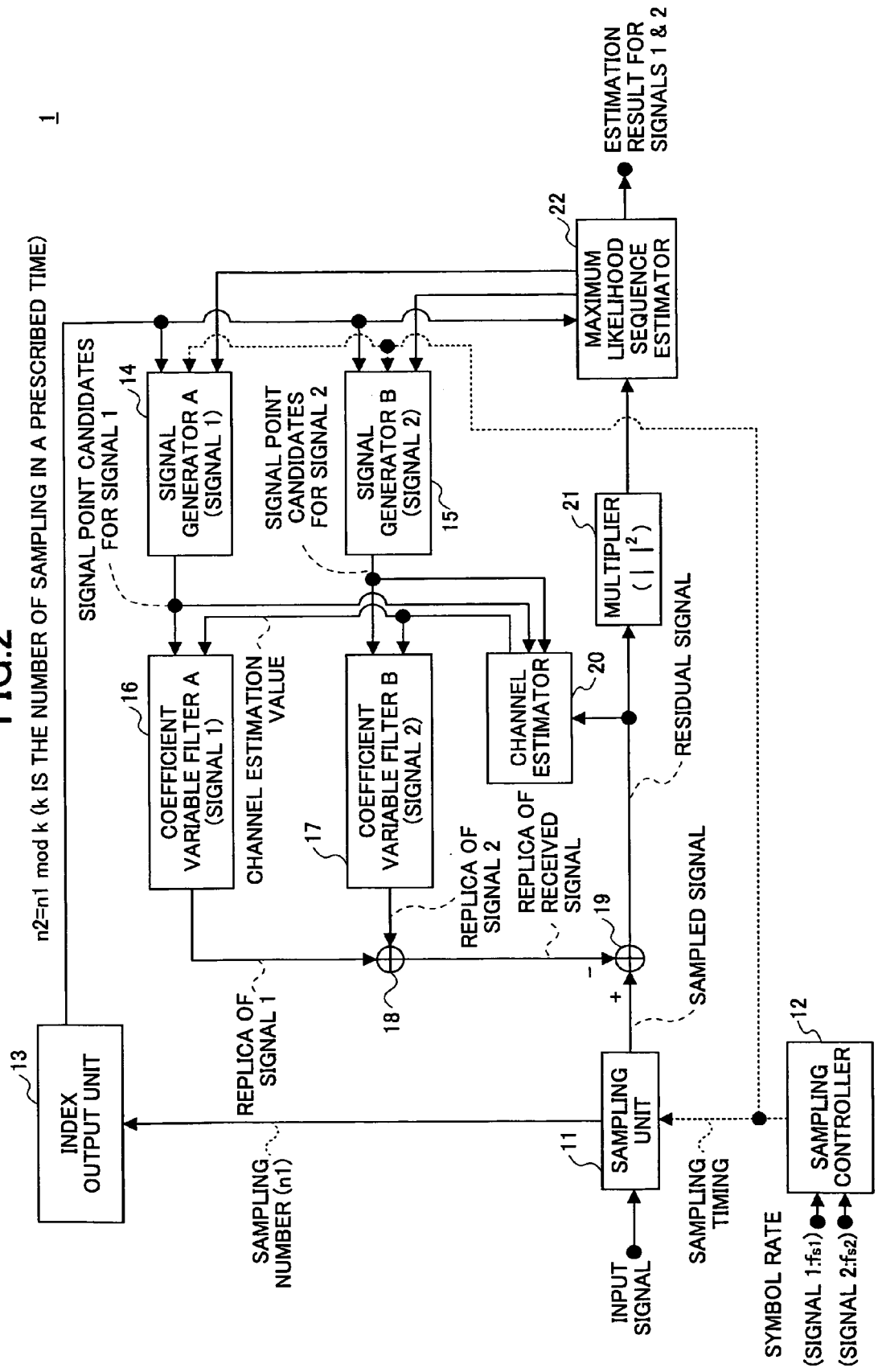
FIG. 2 is a block diagram of a signal separator according to the first embodiment of the invention.

The present invention is now described in detail in conjunction with the attached drawings. FIG. 2 is a block diagram of a signal separator 1 according to the first embodiment of the invention. The signal separator 1 is suitably used in a wireless communication system in which multiple wireless transmitters using different symbol rates of transmission signals and multiple wireless receivers coexist and communicate with each other at the same frequency band. The signal separator 1 is installed in wireless receivers, regardless of whether in mobile stations or fixed stations.

The signal separator 1 includes a sampling unit 11, a sampling controller 12, an index output unit 13, a first signal generator 14, a second signal generator 15, a first coefficient-variable filter 16, a second coefficient-variable filter 17, an adder 18, a subtractor 19, a channel estimator 20, a multiplier 21, and a maximum likelihood sequence estimator 22.

In this embodiment, the signal input to the signal separator 1 is a baseband signal, which has been subjected to bandlimiting at rolloff filters or the like. For the purpose of simplifying the explanation, only two signals (signal 1 and signal 2) contained in the received signal are illustrated.

The signal input to the signal separator 1 is first supplied to the sampling unit 11. The input signal is sampled according to the sampling timing designated by the sampling controller 12, and output as discrete time signals. The sampling controller 12 outputs sampling timing information to the sampling unit 11, in accordance with the symbol rates of the multiple signals in the received signal (symbol rate $f_{s1}$ of signal 1 and symbol rate $f_{s2}$ of signal 2).

Figure 3:
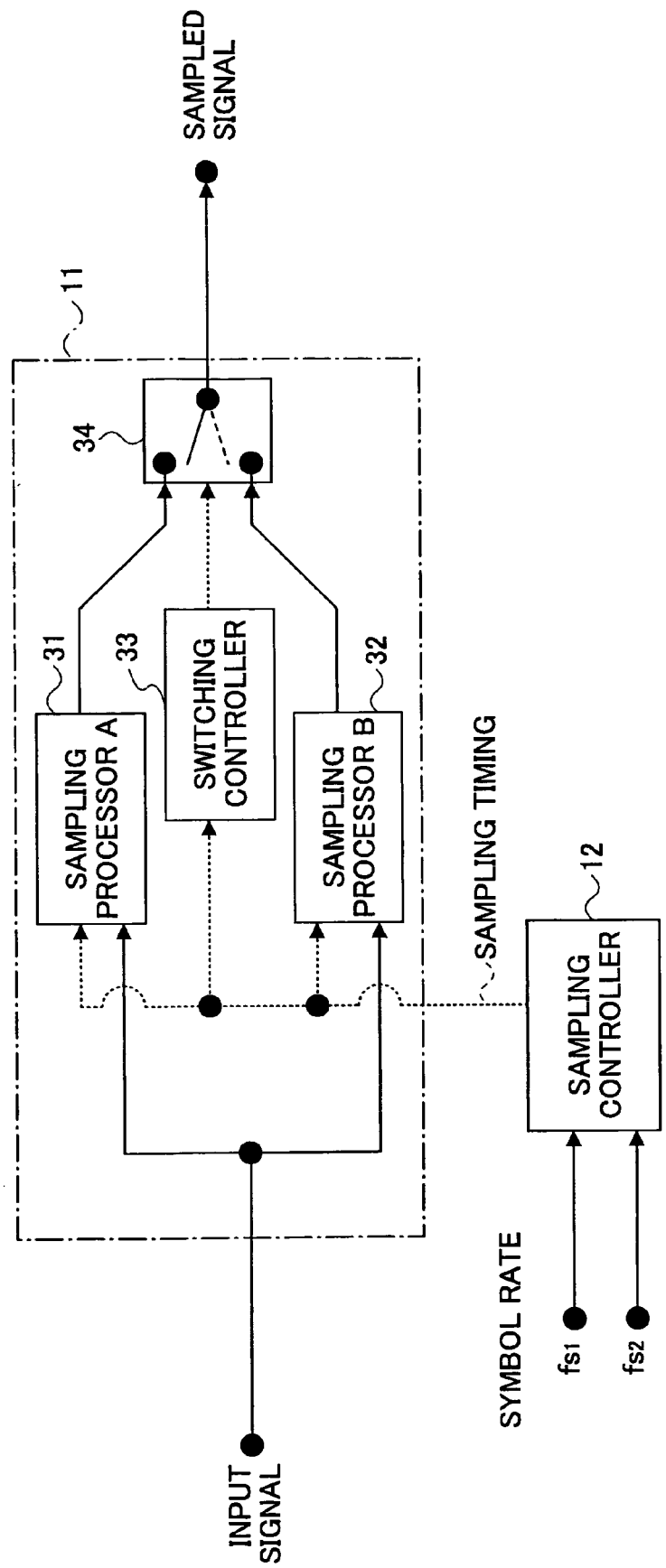
FIG. 3 is a block diagram of the sampling unit used in the signal separator shown in FIG. 2.

FIG. 3 is a block diagram of the sampling unit 11 used in the signal separator 1. The sampling unit 11 includes a first sampling processor 31, a second sampling processor 32, a switching controller 33, and a switch 34.

The signal input to the sampling unit 11 is supplied to the first sampling processor 31 and the second sampling processor 32 in parallel, and sampled at the sampling timing designated by the sampling controller 12 according to the symbol rate of the signal. The sampled signals are supplied to the switch 34. The switching controller 33 controls the switch 34 based on the sampling timing information supplied from the sampling controller 12 based on the symbol rate, such that the sample values are output from the switch 34 in order of time. Consequently, the input signal is sampled at uneven intervals and output to the next component.

Figure 4:
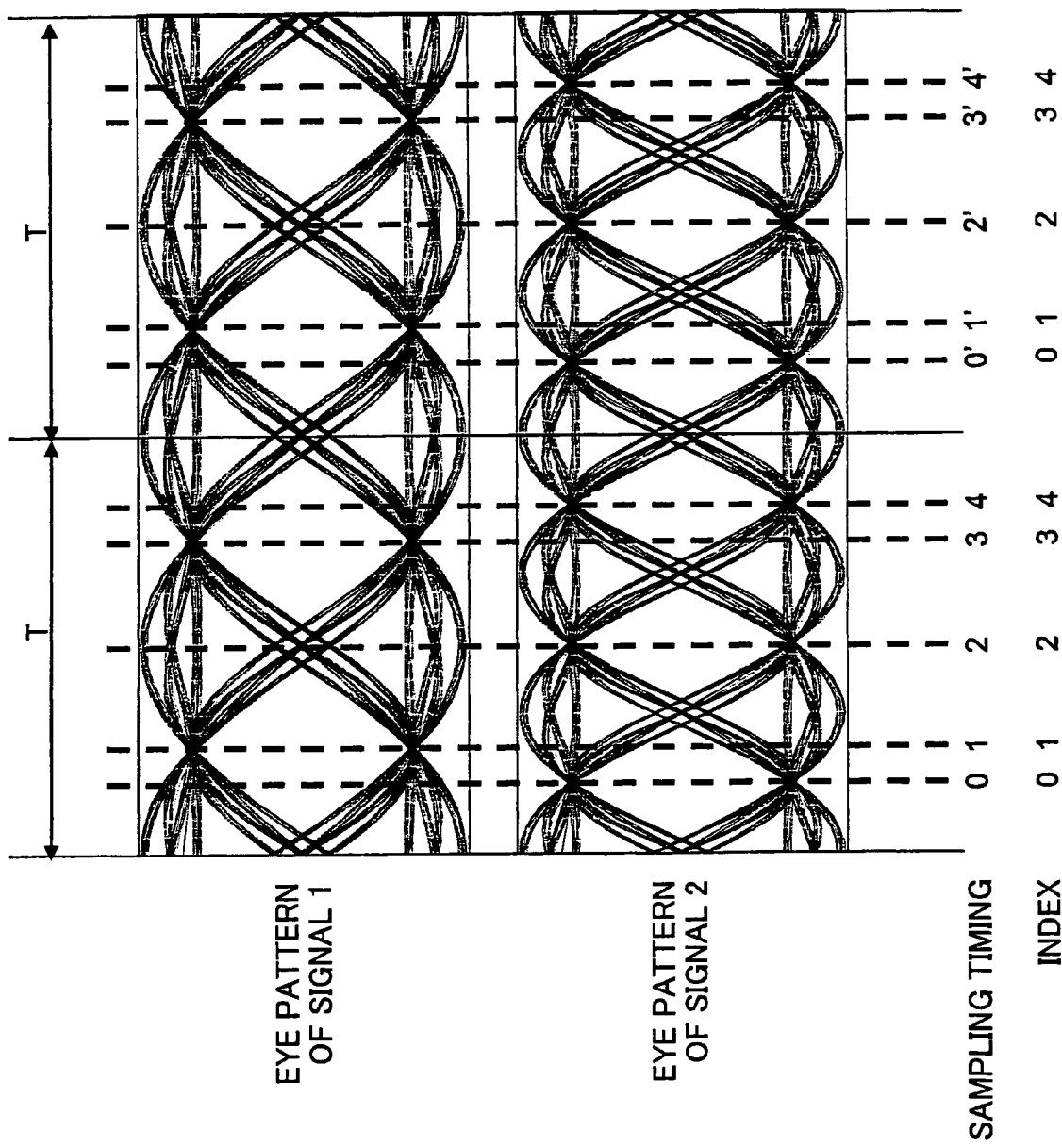
FIG. 4 is a diagram illustrating eye patterns sampled at uneven intervals, together with sampling timing and the index given to each of the sampled signals.

FIG. 4 is a diagram illustrating the eye patterns of signal 1 and signal 2 sampled at uneven intervals by the sampling unit 11, together with the sampling timing and index given to each of the sampled signals. In this embodiment, it is assumed that the signal is ideally sampled at the center or the widest point of the eye pattern (at the eye opening timing) for simplification purposes, and that the ratio of the symbol rate of signal 1 to signal 2 is 2/3. The relation between the sampling timing and the index given to each of the sampled signal is described below.

In this manner, the sampling controller 12 controls the sampling unit 11 such that the received signals are sampled at the associated sampling timing according to the symbol rates of the received signals, and that the sampled signals are output in time series. This arrangement allows the signal points of the received signals to be distributed in the signal space so as to easily separate the received signals from each other.

Figure 5:
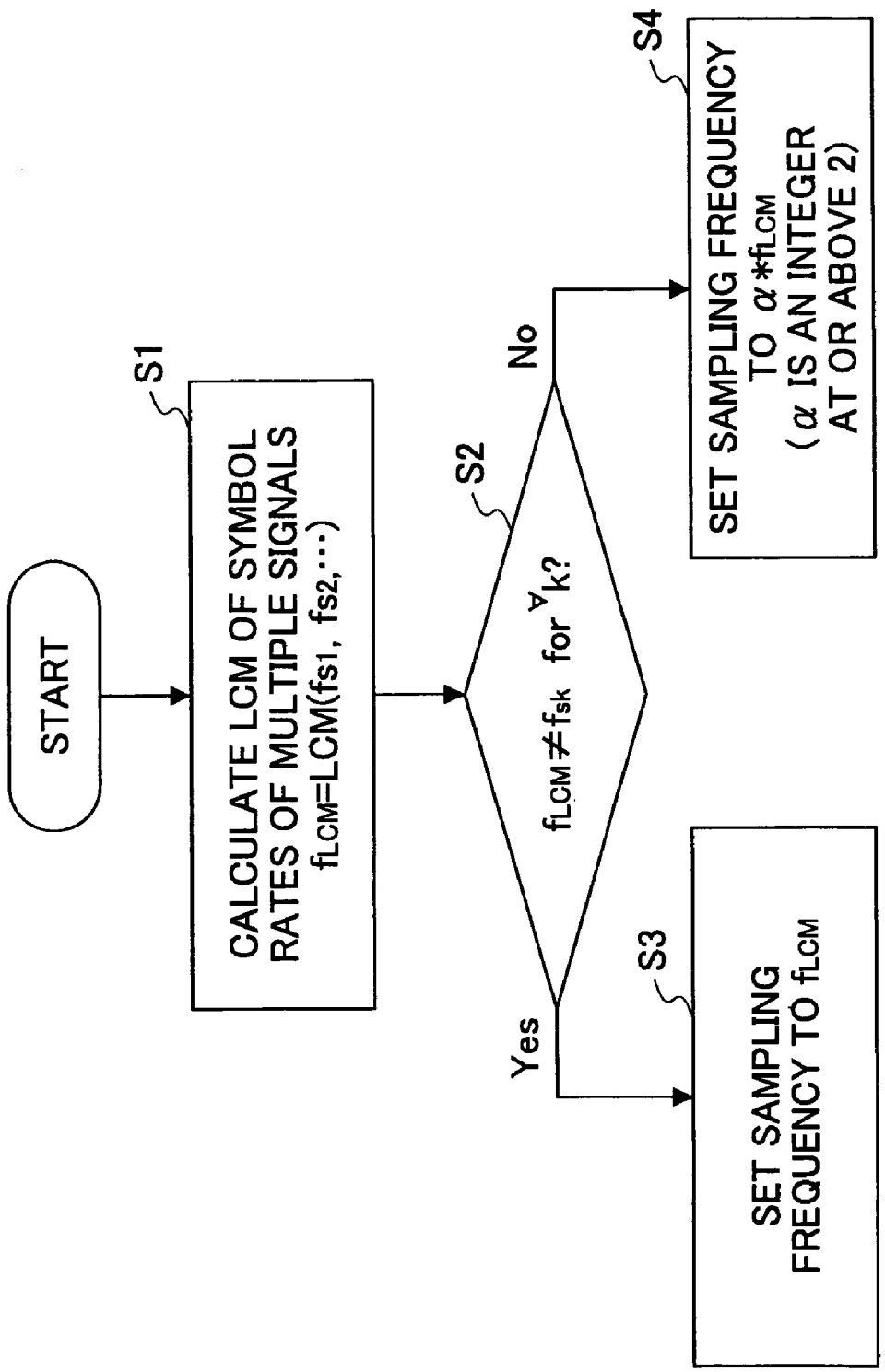
FIG. 5 is a flowchart of the sampling frequency determination process carried out at the sampling unit.

In place of the above-described signal sampling at uneven intervals, the signals can be sampled at a prescribed sampling frequency, as illustrated in the flowchart of FIG. 5.

In FIG. 5, the least common multiple (LCM) of the symbol rates of multiple signals is determined, and a sampling frequency is selected so as to sample the signals at a rate of an integral multiple of the LCM. Since the signals are sampled at even intervals, this method is referred to as an even-interval sampling method.

The even-interval sampling method is explained with reference to FIG. 5. In step S1, the least common multiple $f_{LCM}$ of the symbol rates of multiple signals is determined. Then, in step S2, each of the symbol rates of the multiple signals is compared with the LCM rate $f_{LCM}$, according to formula $f_{LCM} \neq f_{sk}$ for $\forall k$?

where k is an integer greater than or equal to 1, and $\forall$ denotes all the symbol rates of the multiple signals.

In the comparison in S2, each of the symbol rates ($f_{s1}$, $f_{s2}$, . . .) is compared with $f_{LCM}$, and it is determined whether the formula is satisfied. If the least common multiple $f_{LCM}$ agrees with the highest symbol rate among the multiple signals (NO in step S2), the process proceeds to step S4, and the sampling frequency is set to $\alpha$ times $f_{LCM}$ (where $\alpha$ is an integer greater than or equal to 2). In this case, the sampling controller 12 instructs the sampling unit 11 to sample the input signal at a rate of $\alpha * f_{LCM}$. Because the input signal is sampled at a sampling frequency greater than or equal to twice the symbol rate of any received signal, the signal waveform can be reproduced accurately even under the environment in which synchronization is not guaranteed.

If it is determined that the least common multiple $f_{LCM}$ of the symbol rate does not agree with any of the symbol rates of the multiple signals (YES in step S2), the process proceeds to step S3, and the sampling frequency is set to $f_{LCM}$.

A single sampling unit is sufficient to carry out the even-interval sampling method, and therefore, the structure of the signal separator can be simplified.

Figure 6:
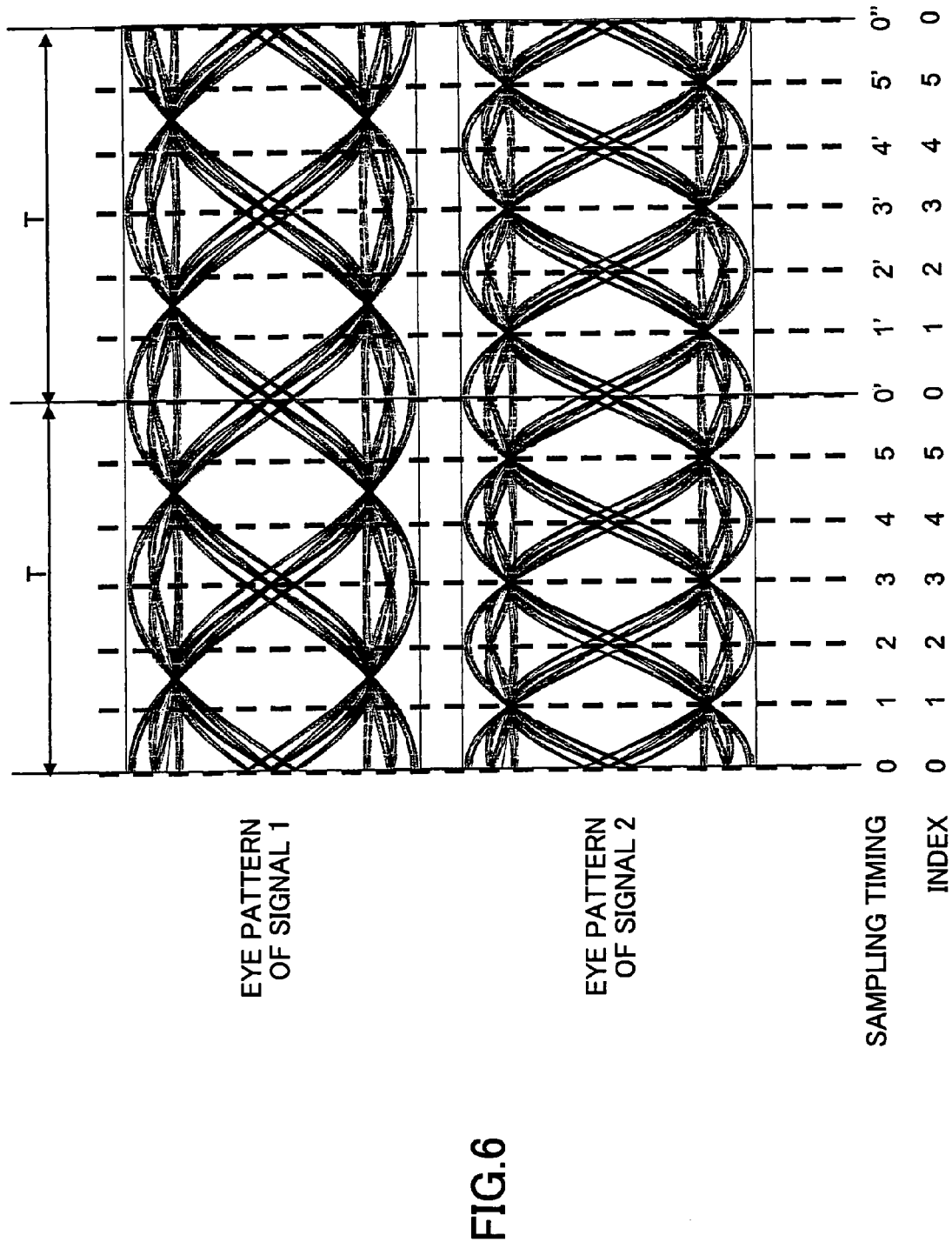
FIG. 6 is a diagram illustrating eye patterns sampled at even intervals, together with sampling timing and the index given to each of the sampled signals.

FIG. 6 is a diagram illustrating the eye patterns of signal 1 and signal 2, together with the sampling timing and the index given to each of the sampled signals, obtained using the even-interval sampling method. Similar to the example shown in FIG. 4, the ratio $f_{s1}/f_{s2}$ of the symbol rate of signal 1 to that of signal 2 is 2/3. The sampling frequency becomes $3f_{s1}$, which equals $2f_{s2}$. The index is given to each of the signals sampled at even intervals.

In this manner, the sampling controller 12 outputs a sampling control signal so as to cause the sampling unit 11 to sample the received signal according to a rate equal to a common multiple of the symbol rates of multiple received signals. The sampling rate is determined in a simple manner, and sampling of the received signal is implemented with the sample structure.

Returning to FIG. 2, the sampling unit 11 supplies the sampling counts n1 to the index output unit 13 when sampling the input signal, while it supplies the sampled signal to the subtractor 19. Even if the same symbols are received, it is improper for the sampled signals output from the sampling unit 11 to be treated equally because the signal point (or constellation point) varies due to the inter-symbol interference under the influence of the bandlimiting filter, depending on the sampling timing. To overcome this problem, the index output unit 13 is configured to group the sampled signals into multiple categories, based on the sampling counts, such that the sampled signals grouped in the same category have similar signal characteristics according to the sampling timing.

The operation of the index output unit 13 is explained in conjunction with FIG. 4. Since in this example the symbol rate ratio of signal 1 to signal 2 is 2/3, time required for two symbols of signal 1 is equal to time required for three symbols of signal 2. This time span is denoted as T. The received signal, which is a combination of signal 1 and signal 2, will have the same characteristic every time period T.

For example, signals sampled at sampling timing 0 and sampling timing 0' are separate from each other by time T, and these two sampled signals can be treated as the signals with similar characteristics belonging to the same group. Similarly, signals sampled at time 1 and time 1' are treated as the same group. The same applies to signals sampled at time 3 and time 3', and signals sampled at time 4 and time 4'. Accordingly, the index output unit 13 gives the same index to the same group, and outputs the index signals representing the signal groups.

In general, if there are multiple signals, such as signal 1, signal 2, . . . , and if the symbol rate ratio of (signal 1):(signal 2): . . . is expressed as m:n: . . . , then the remainder of dividing the total number of samplings (n1) by the number of sampling within the time period T (five in the example shown in FIG. 4), which period corresponds to m symbols of signal 1, n symbols of signal 2, etc., is used as the index n2.

In this example, the index output unit 13 performs operations according to n2=n1 mod k, and gives a set of indexes as follows:

0 mod 5=0
1 mod 5=1
2 mod 5=2
3 mod 5=3
4 mod 5=4.

The calculated index is output as index signals, and supplied to the signal generators 14 and 15, and to the maximum likelihood sequence estimator 22.

Each of the signal generators 14 and 15 outputs a signal point (constellation point) corresponding to the index signal for every possible candidate of symbol sequence.

Figure 7A:
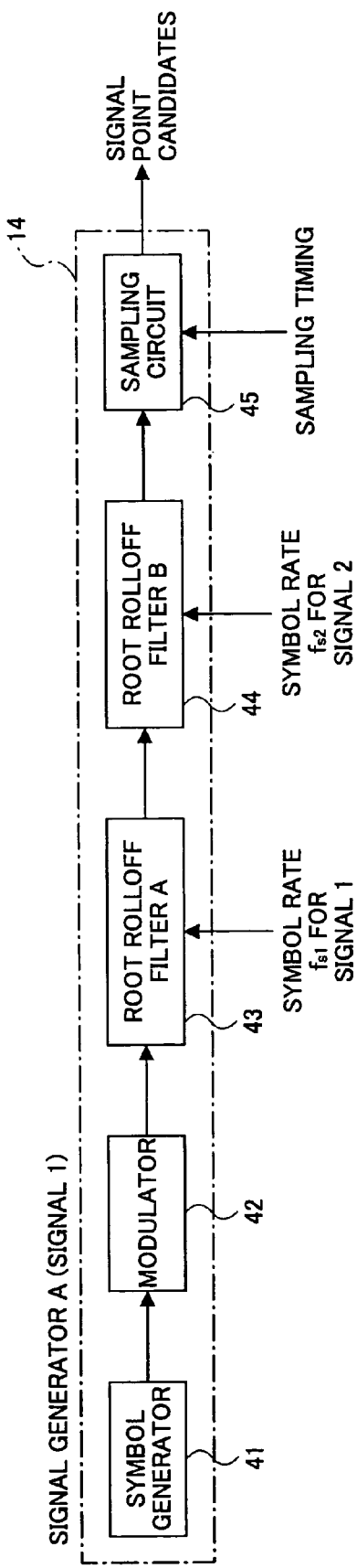
FIG. 7A and FIG. 7B illustrate examples of the signal generator shown in FIG. 2.
Figure 7B:
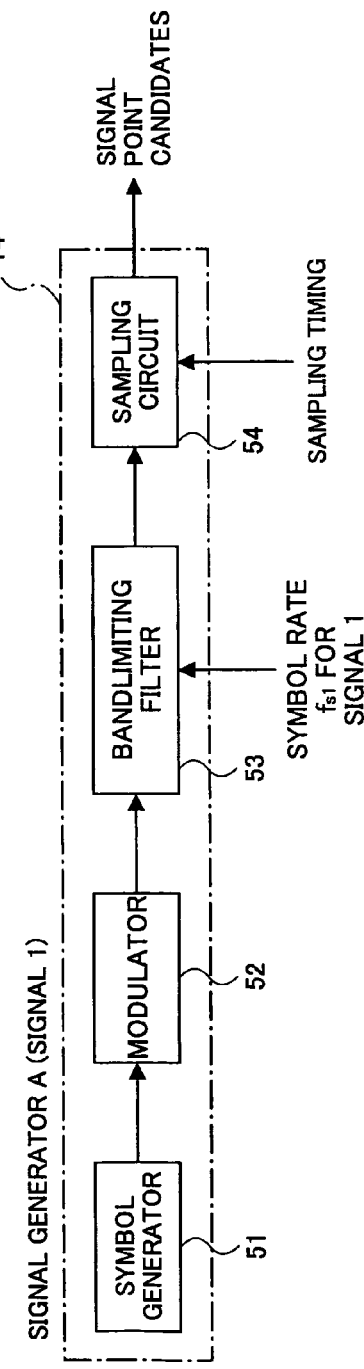

FIG. 7A and FIG. 7B are examples of the signal generator 14. Since the signal generator 14 and signal generator 15 operate in the same manner with the same structure, explanation is made of only the signal generator 14 for signal 1.

The signal generator 14 may have either structure shown in FIG. 7A or FIG. 7B. In FIG. 7A, the symbol generator 41 generates all possible candidates of symbol sequence. The modulator 42 modulates each of the symbol sequence candidates. The modulated symbol sequences are subjected to bandlimiting at the root rolloff filters 43 or 44, and sampled at the sampling circuit 45 according to the sampling timing designated by the sampling controller 12. Then the sampling result is output from the signal generator 14. Similarly, in FIG. 7B, the symbol generator 51 generates all possible candidates of symbol sequence. The modulator 52 modulates each of the symbol sequence candidates. The modulated symbol sequences are subjected to bandlimiting at the bandlimiting filter 53, and sampled at the sampling circuit 54 according to the sampling timing designated by the sampling controller 12. The sampling result is output from the signal generator 14.

If a pair of filters, such as root rolloff filters, is used at the transmitting and receiving ends, and if multiple signals contained in the received signal have different symbol rates, then bandlimiting filtering is performed at the receiving end for each of the symbol rates. In this case, the filter used at the transmitting end and the filter used at the receiving end are cascaded, as illustrated in FIG. 7A, and sampling is performed after the filtering.

Figure 8B:
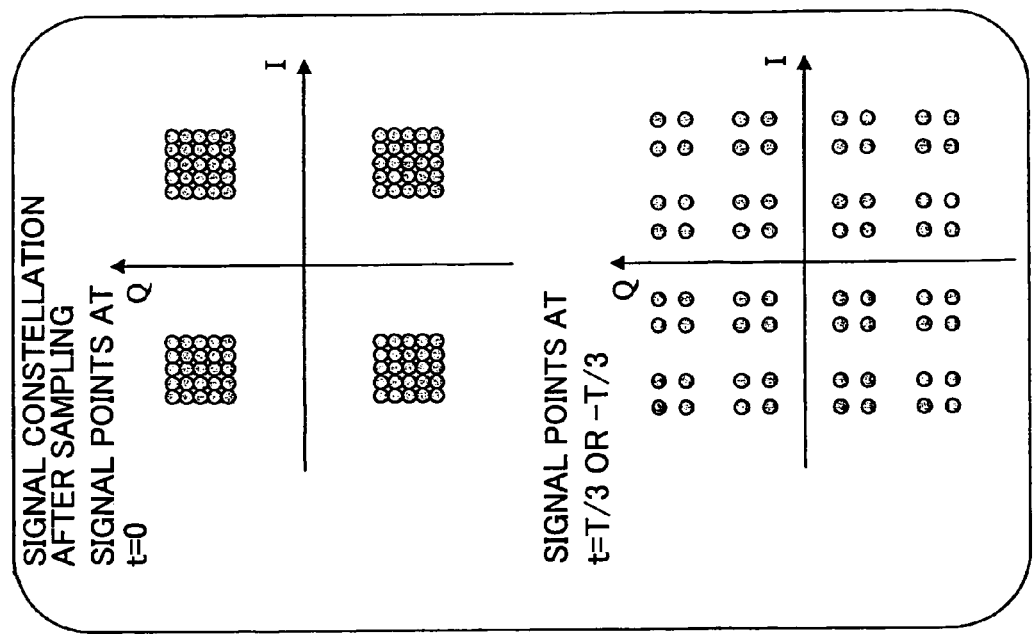
FIG. 8A and FIG. 8B illustrate filter output and signal constellation, respectively, obtained from the signal generator shown in FIG. 7A.

Examples of the set of signal point candidates generated by the signal generator 14 shown in FIG. 7A and FIG. 7B are explained with reference to FIG. 8 and FIG. 9, respectively. FIG. 8B illustrates the signal point candidates output from the signal generator 14 30 shown in FIG. 7A, on the condition that the limiting band of the transmission filter and that of the receiving filter are different from each other, and that the limiting bandwidth of the transmission filter is narrower than that of the receiving filter.

Figure 8A:
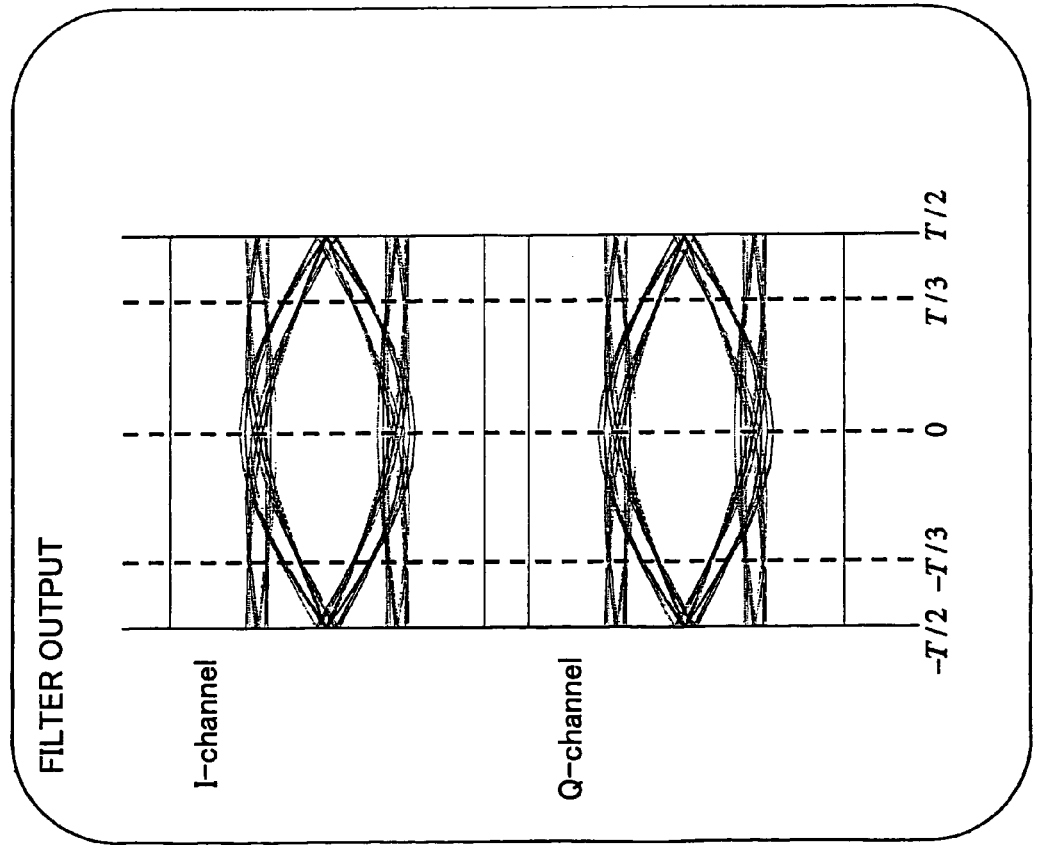

FIG. 8A illustrates the signal waveforms (eye patterns) having passed through the second root rolloff filter 44 on I channel (top) and Q channel (bottom). In this example, the sampling rate is three times as high as the symbol rate, and sampling is performed at timing indicated by the dashed line.

With this filter output, the post-sampling constellation of the signal point candidates becomes one shown in FIG. 8B. Although the signal points become substantially the same at t=−T/3 and t=T/3, these two have to be treated as different signals under different conditions because each of the signal points corresponds to a different candidate of symbol sequence.

FIG. 9A illustrates the signal waveforms (eye patterns) having passed through the bandlimiting filter 53 of the signal generator 14 shown in FIG. 7B. FIG. 9B illustrates the constellation of the signal point candidates output from the sampling circuit 54. In this case, the input signal is subjected to bandlimiting only at the transmission filter. Accordingly, there is no inter-symbol interference at t=0, and only four signal points appear.

In this manner, signal point candidates can be obtained at every sampling time. In other words, the signal generator 14 produces signal waveforms that are not influenced by noise or fading for all the symbol sequence candidates, samples the signal waveforms at prescribed sampling timing designated by the sampling controller 12, and outputs a set of signal point candidates on the signal space.

The signal point candidates generated by the signal generator 14 are input to the coefficient-variable filter 16 for signal 1. Similarly, the signal point candidates generated by the signal generator 15 are input to the coefficient-variable filter 17 for signal 2. Since the basic structures of the coefficient-variable filters 16 and 17 are the same, explanation is made using the coefficient-variable filter 16 as an example.

At the coefficient-variable filter 16, a filter coefficient is set according to the instruction from the channel estimator 20 so as to reproduce the level fluctuation and phase rotation due to the influence of fading or the like in each of multiple signals. The coefficient-variable filter 16 has multiple taps for inputting the coefficients, and generates a replica of a delayed wave.

Figure 10:
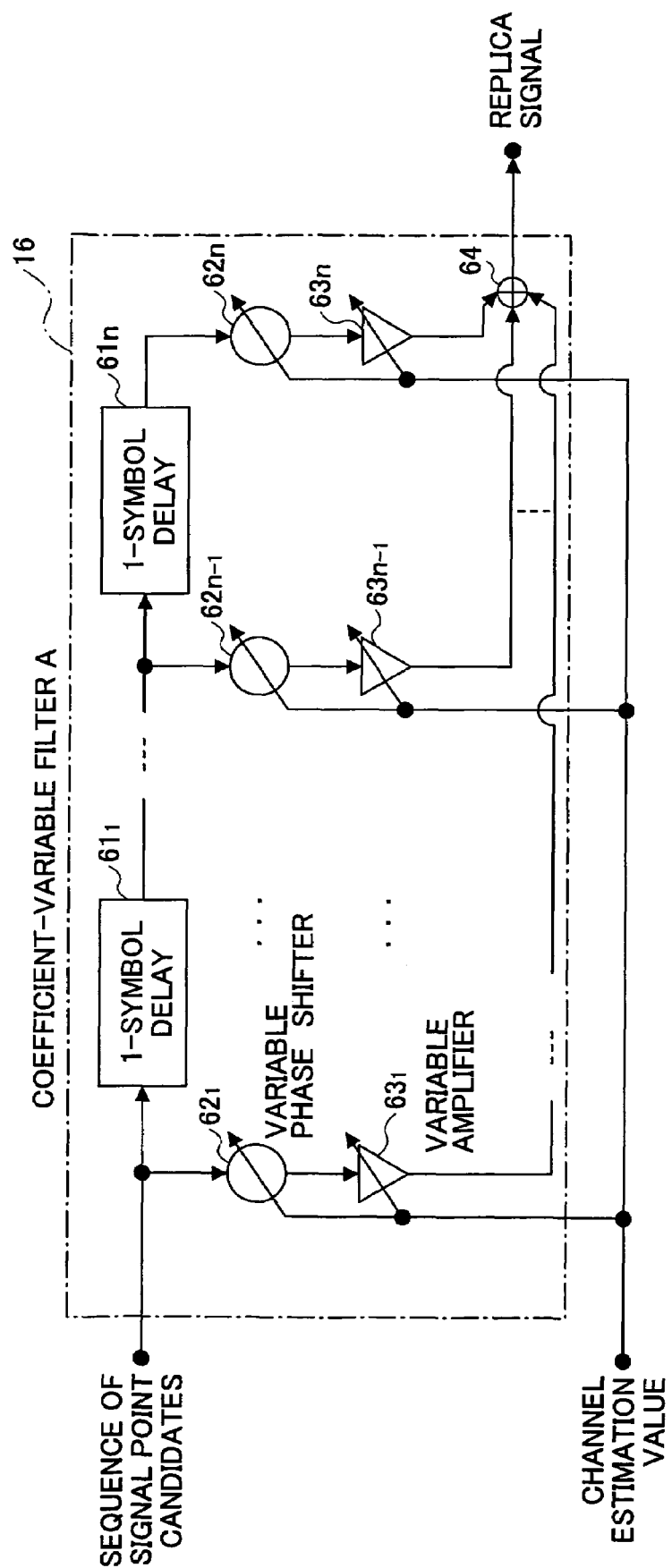
FIG. 10 is a block diagram of the coefficient-variable filter used in the signal separator shown in FIG. 2.

FIG. 10 is a block diagram of the coefficient-variable filter 16. The coefficient-variable filter 16 has 1-symbol delay circuits $61_1$ through $61_n$, through which a sequence of signal point candidates including the signal point candidates for 1-symbol delayed wave is input. Phase and level adjustment is performed on the signal point candidate sequence by a set of variable phase shifters $62_1$ through $62_n$ and a set of variable amplifiers $63_1$ through $63_n$. The phase and level adjusted signal points are summed up at the adder 64 to generate the replica of signal 1 containing the 1-symbol delayed wave. The coefficients of the variable phase shifters $62_1$ through $62_n$ and the variable amplifiers $63_1$ through $63_n$ are controlled by the estimated channel value output from the channel estimator 20. Similarly, a replica of signal 2 is generated by the coefficient-variable filter 17.

When the replicas of multiple signals are generated, these replicas are added to each other to produce a replica of the received signal that is a combination of the multiple signals.

The coefficient-variable filter 16 is furnished with multiple taps for inputting coefficients so as to deal with the signal containing the delayed wave arriving in a time-spread manner, and outputs a replica of the received signal containing the delayed wave. Since the delayed wave is taken into account when producing the replica of the received signal, a more accurate replica of the received signal can be produced.

Returning to FIG. 2, the replica of the received signal is supplied to the subtractor 19, which subtracts the replica of the received signal from the input and sampled received signal to produce a residual signal. The residual signal is supplied to the multiplier 21 and the channel estimator 20. The multiplier 21 multiplies the input residual signal by itself (or by the complex conjugate if the input residual signal is a complex number), and outputs the multiplication result to the maximum likelihood sequence estimator 22.

The maximum likelihood sequence estimator 22 estimates the transmitted symbol sequences of the multiple signals simultaneously, using a state transition diagram, on the basis of the multiplication result of the residual signal supplied from the multiplier 21, and outputs the estimation result. An example of the state transition diagram is shown in FIG. 11.

Figure 11:
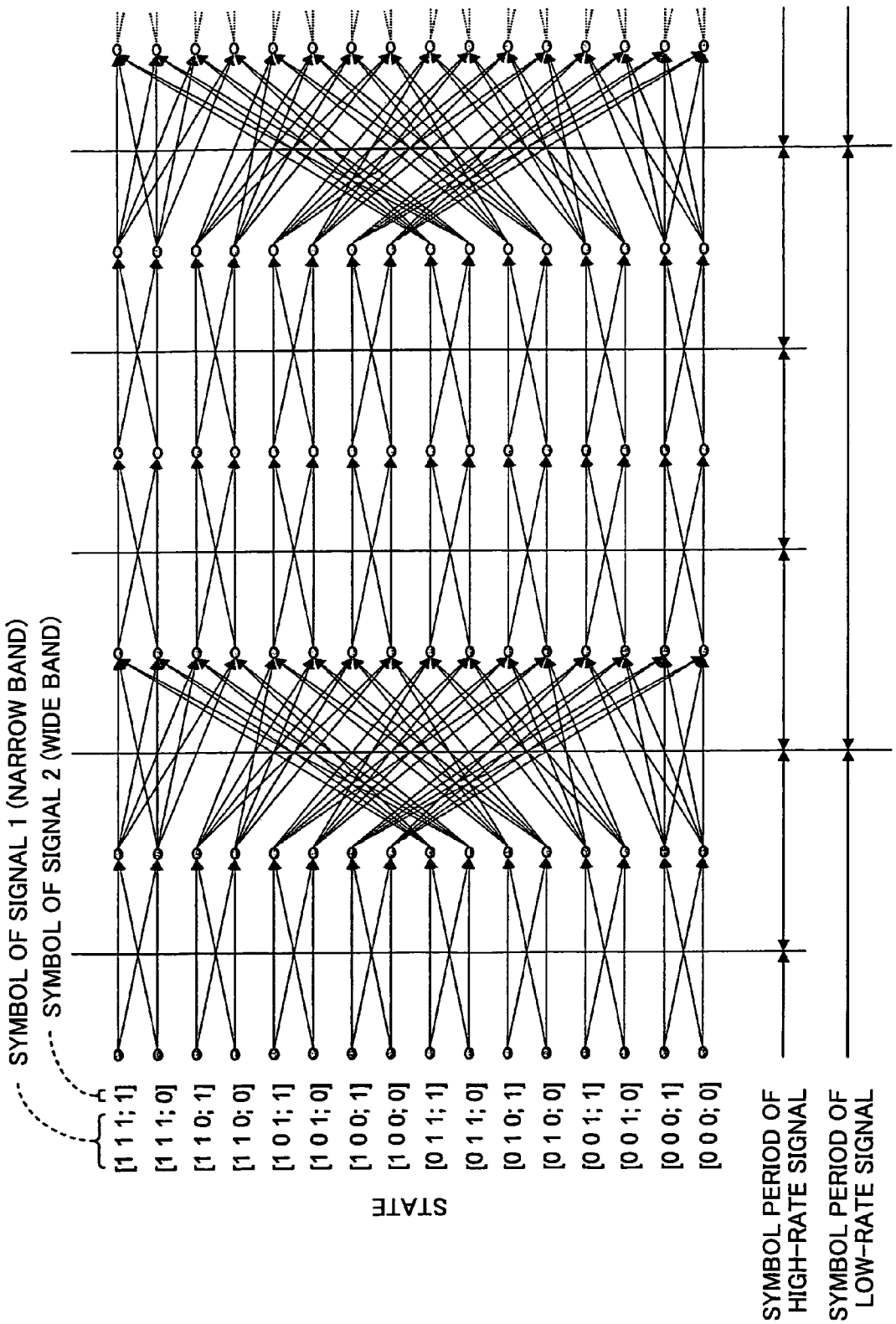
FIG. 11 is a trellis diagram created from the state transition diagram indicating the operation of the maximum likelihood sequence estimator.

FIG. 11 is a trellis diagram created based on the state transition diagram representing the operation of the maximum likelihood sequence estimator 22. For simplification purposes, the example shown in FIG. 11 is on the assumption that there is no delay wave and BPSK modulation is employed. In addition, the symbol rate ratio of signal 1 to signal 2 is 1/3, which means that three symbols of signal 2 are transmitted, while a symbol of signal 1 is transmitted. The symbols in the bracket shown in FIG. 11 represent [(the state of the desired wave); (the state of the interference wave)].

If signal 2 can be ideally sampled at timing without inter-symbol interference, as illustrated in FIG. 19B, the state of signal 2 becomes noncorrelated with the previous and next symbols at sampling timing, and therefore, the state with inter-symbol interference does not have to be considered for signal 2.

On the other hand, one-symbol time of signal 1 is longer, as compared with signal 2. Accordingly, if signal 1 is sampled in accordance with a high-symbol-rate signal, such as signal 2, signal points containing inter-symbol interference components, as illustrated in FIG. 19A, have to be taken into account. In this case, signal 1 is subjected to inter-symbol interference from the previous and next symbols along the time axis (not only past symbols, but also future symbols with respect to the current symbol), as illustrated in FIG. 20. For this reason, it is desired to define the state of signal 1 using past symbols, the present symbol, and future symbols. An example of the definition of signal 1 is [(past symbol sequence) (the current symbol) (future symbol sequence)]. In the example shown in FIG. 20, the total of five symbols, including two past symbols, one current symbol, and two future symbols, are considered.

In the example of FIG. 11, one-symbol time of signal 1 agrees with three-symbol time of signal 2. Accordingly, signal 2 changes its state three times, while signal 1 changes the state once. Since state transition of signal 1 takes the inter-symbol interference into account, only those state transition taking into account the past and future symbols are considered. For example, the state changes from "001" only to "010" and "011". To sum up, if only signal 2 changes its state, without state transition of signal 1, the relation

[a1 a2 a3 *]→[a1 a2 a3 **]

stands, where symbols "*" and "**" are either 0 or 1.

If signal 1 changes its state and signal 2 also changes its state, then the relation

[a1 a2 a3 *]→[a2 a3 * ]

stands, where symbols "*", "" and "*" are either 0 or 1.

In this manner, the next state that can possibly occur is limited depending on the previous state and time, and accordingly, the trellis diagram shown in FIG. 11 can be created based on the state transition diagram. The arrows depicted in FIG. 11 to indicate the availability of state transition are called "paths".

The output of the multiplier 21, which is the absolute square of the residual signal input to the multiplier 21, is stored as the state transition reference, in association with each state (each symbol candidate), in the maximum likelihood sequence estimator 22. The maximum likelihood sequence estimator 22 adds this residual signal to the accumulations of the past errors in all possible paths, and sums them up. For example, if the error in state [n, m] at time k is $w_{n,m}(k)$, as illustrated in FIG. 12, then the accumulated error in state [111, 1] at time (k+3) becomes $$w_{1,1}(k) + w_{1,1}(k+1) + w_{1,1}(k+2) + w_{1,1}(k+3)$$
$$w_{1,1}(k) + w_{1,1}(k+1) + w_{1,0}(k+2) + w_{1,1}(k+3)$$
$$\vdots$$
$$w_{5,0}(k) + w_{5,0}(k+1) + w_{1,1}(k+2) + w_{1,1}(k+3)$$

This calculation is made for all the sates, and a path with the minimum accumulated error is determined. Thus, the maximum likelihood sequence estimator estimates that the symbol sequence that defines the path with the minimum accumulated error is transmitted, and outputs the estimation result for each of the multiple signals contained in the received signal.

Figure 12:
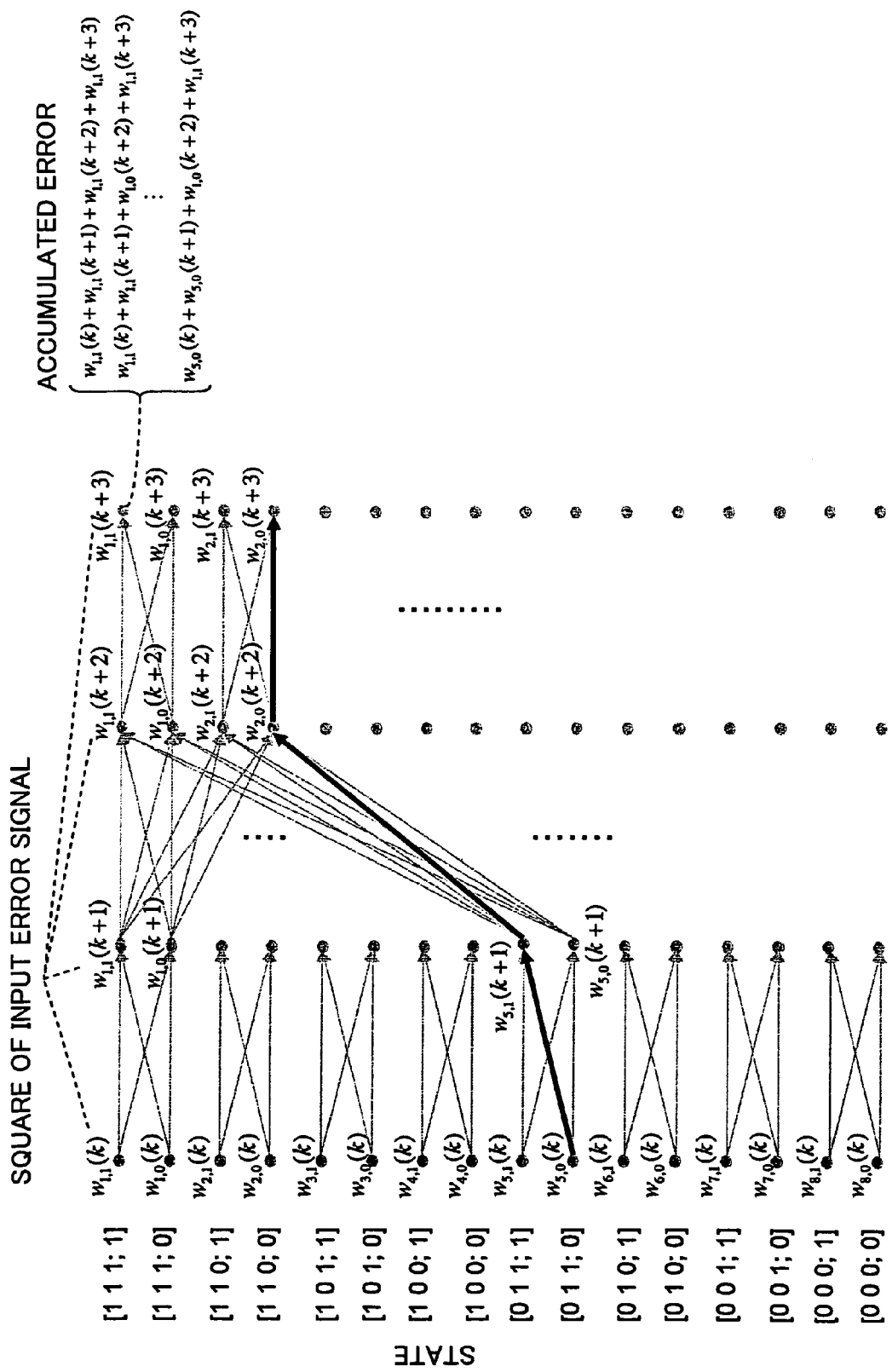
FIG. 12 is a diagram illustrating the relation between the accumulated error (determination criterion) and the trellis diagram created from the state transition diagram.

For example, if the path depicted by the bold arrows in FIG. 12 yields the minimum accumulated error, then the state of signal 1 has changed from [011] to [110], while signal 2 has changed its states as [0]→[1]→[0]→[0]. At this point of time, it can be estimated that signal 1 is transmitting a sequence [0110] and signal 2 is transmitting a sequence [0101].

During the estimation, the output timings of the estimation results for signal 1 and signal 2 are designated by the indexes supplied from the index output unit 13. The timing for outputting the estimation result may be determined based on the buffer size of the maximum likelihood sequence estimator 22.

Independent of the estimation, the maximum likelihood sequence estimator 22 supplies symbols that give the replica signals closest to the received signal to the signal generators 14 and 15, respectively. Each of the signal generators 14 and 15 supplies the signal point corresponding to the input symbol to the channel estimator 20. The channel estimator 20 uses the signal point and the residual signal supplied from the subtractor 19 to estimate the channel of the received signal, including its delay components, based on the adaptive algorithm, and controls the filter coefficient of each of the coefficient-variable filters 16 and 17.

By repeating the above-described operations, multiple signals having different symbol rates can be separated from the received signal.

With the signal separator 1 of the first embodiment, the sampled signals are classified by the indexes output from the index output unit 13, and candidates of the signal point are generated according to the classification to separate signals. In other words, index signals are used to classify the signals and remove interference signals from the received signal.

The signal separator 1 can prevent degradation of accuracy in generating the replica due to variation in possible signal point candidates due to difference in sampling timing, and accordingly, multiple signals with different symbol rates can be transmitted in the same frequency band in the system using the signal separator of the first embodiment. In other words, even if multiple systems coexist in the same frequency band, the frequency utilization efficiency can be improved by employing the signal separator of the first embodiment.

Next, the second embodiment of the invention is described with reference to FIG. 13 through FIG. 15.

Figure 13:
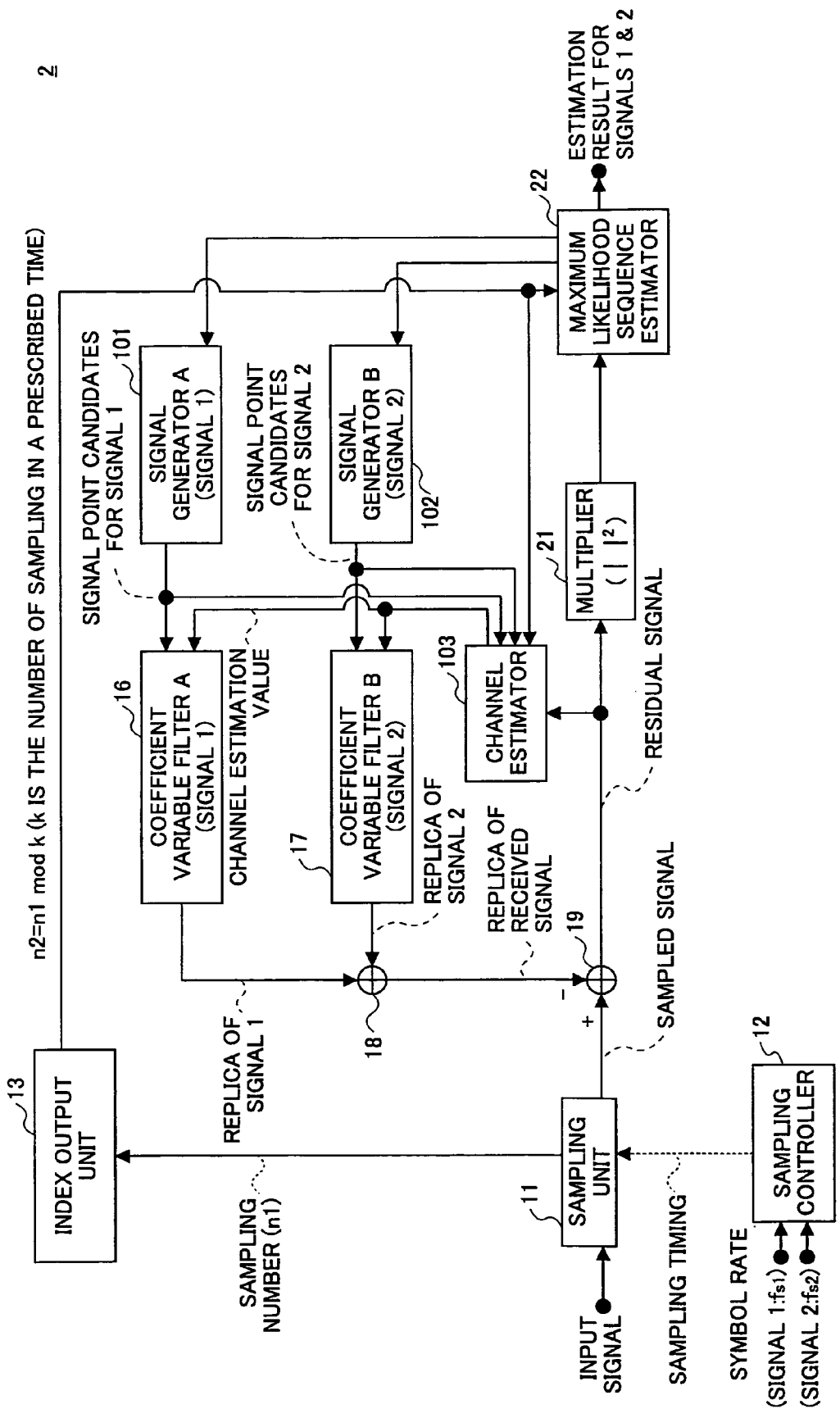
FIG. 13 is a block diagram of a signal separator according to the second embodiment of the invention.

FIG. 13 is a block diagram of the signal separator 2 according to the second embodiment. As compared with the first embodiment, the operation of the channel estimator differs, and the other functions are the same. Focusing is made mainly on the difference, that is, the operations and structures of the signal generator and the channel estimator, and explanation for the unchanged parts is omitted. The same components as those in the first embodiment are denoted by the same reference numbers.

Since the basic structures of the first and second signal generators 101 and 102 are the same, explanation is made using only the first signal generator 101 as an example.

Figure 14:
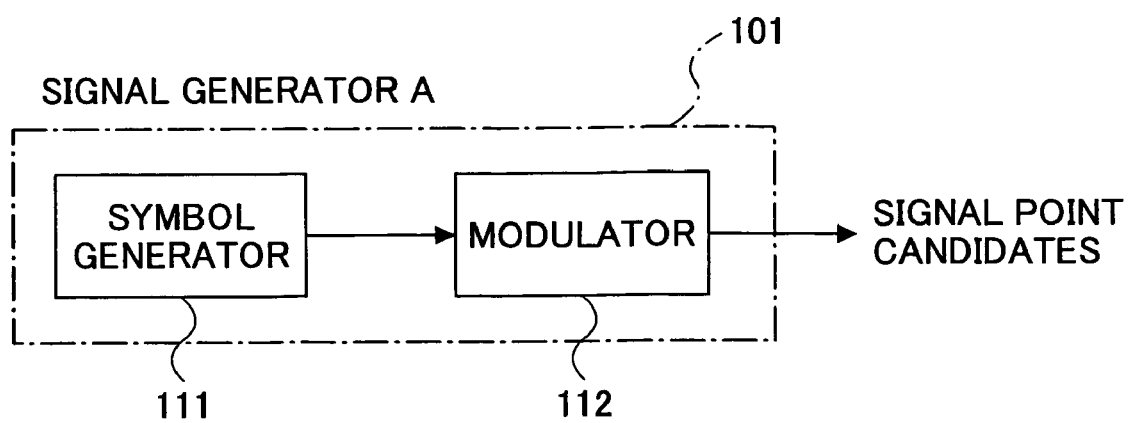
FIG. 14 is a block diagram of the signal generator used in the signal separator shown in FIG. 13.
Figure 15:
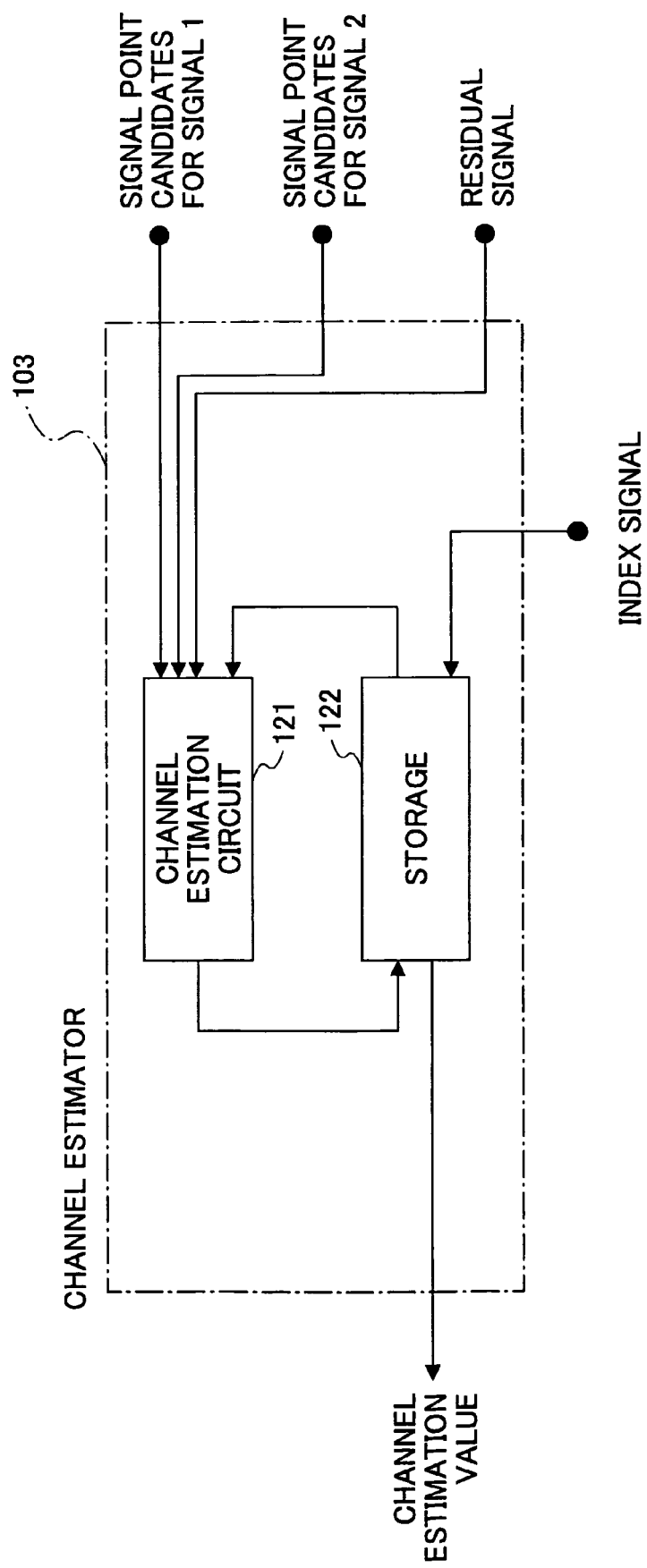
FIG. 15 is a block diagram of the channel estimator used in the signal separator shown in FIG. 13.

FIG. 14 is a block diagram of the signal generator 101 used in the signal separator 2, which is a conventional signal generator including a symbol generator 111 and a modulator 112. The symbol generator 111 generates a set of symbol candidates. The modulator 112 modulates each of the symbol candidates, and outputs signal point candidates without inter-symbol interference, like a conventional interference canceller. (In the first embodiment, the signal generator 14 outputs the signal point candidates on the signal space, corresponding to the indexes supplied from the index output unit 13.) In the second embodiment, the indexes are supplied from the index output unit 13 to the channel estimator 103, and the channel estimator 103 estimates the inter-symbol interference generated at sampling timing when estimating the level fluctuation and phase rotation in the channel. The level fluctuation and the phase rotation vary depending on the index designated by the index output unit 13. Unless the channel estimation is performed independently for each index, the adaptive algorithm of the channel estimator cannot follow the abrupt change of signal points, and the estimation accuracy of the channel estimator may be degraded. To avoid this problem, the channel estimator 103 of the second embodiment has a storage 122 and a channel estimation circuit 121, as illustrated in FIG. 15. The storage is configured to store estimated channel values (i.e., the estimation results made by the channel estimator 103) in association with the corresponding indexes. Thus, a estimated channel value is produced independently for each of the indexes. An actual example of channel estimation is described below.

Upon receiving an index signal from the index output unit 13, the channel estimator 103 searches in the storage 122 for the estimated channel value corresponding to the input index for each signal, and supplies the searched out estimate as a filter coefficient to each of the coefficient-variable filters 16 and 17 provided for signal 1 and signal 2, respectively. The coefficient-variable filters 16 and 17 generate replicas of signal 1 and signal 2, respectively, based on the estimated channel values.

An residual signal representing the difference between the generated replica and the actually input signal, as well as the signal points of signal 1 and signal 2 that minimize the residual signal, are input to the channel estimation circuit 121 of the channel estimator 103. The channel estimation circuit 121 updates the estimated channel value based on the signal points and the residual signal, using the adaptive algorithm, and stores the updated channel value in association with the index. By repeating this operation at the channel estimator 103, multiple signals with different symbol rates can be separated from the received signal, as in the first embodiment.

Thus, in the second embodiment, the sample signals are classified according to the indexes supplied from the index output unit 13, and the level fluctuation and the phase rotation of the received signal are estimated according to the classification. The inter-symbol interference due to difference in sampling timing can be determined as the influence of the delay waves in the channel, and accordingly, multiple signals with different symbol rates can be separated from the received signal.

Figure 16:
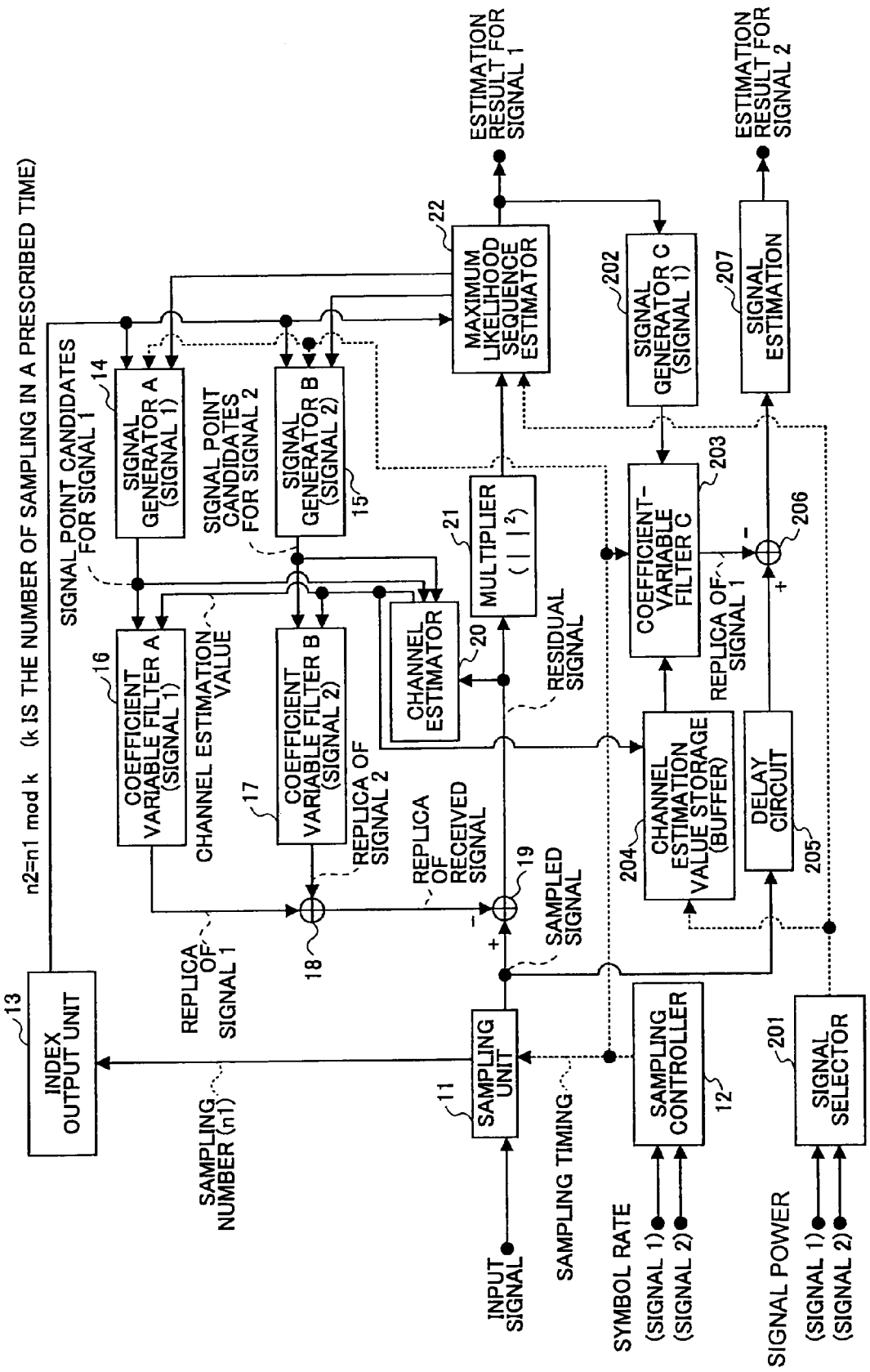
FIG. 16 is a block diagram of a signal separator according to the third embodiment of the invention.

FIG. 16 is a block diagram of a signal separator 3 according to the third embodiment of the invention. The signal separator 1 of the third embodiment includes a signal selector 201 for designating a selected signal, a third signal generator 202 for outputting a signal point based on the estimated signal, a channel estimation value storing unit (buffer) 204 for storing the past channel estimation values, a third coefficient-variable filter 203 using a value representing the level fluctuation and the phase rotation stored in the channel estimation value storing unit 204 as the filter coefficient, a delay circuit 205 for dallying the received signal, a subtractor 206, and a signal estimator 207, in addition to the components of the signal separator 1 of the first embodiment.

Explanation is omitted for the same components as those in the first embodiment, which are denoted by the same reference numbers. Although the signal separator 3 makes use of the structure of signal separator 1 of the first embodiment, it may be applied to signal separator 2 of the second embodiment.

In FIG. 16, the signal separator 3 estimates multiple signals, as in the first embodiment. The signal selector 201 selects a signal with a high reception quality based on, for example, the signal power level, the CNR, the SNR, or the bit error rate, among the multiple signals included in the received signal. In this example, signal 1 is selected as one having a high reception quality (or a high power level). The selection result is supplied to the maximum likelihood sequence estimator 22, and the estimation result of signal 1 is then supplied from the maximum likelihood sequence estimator 22 to the third signal generator 202 for the selected signal.

In signal selection, the power levels of the multiple signals may be compared using the receiving power levels of the control signals transmitted from the multiple signals. Alternatively, the power levels may be measured using difference sequences of PN codes as the identification signals.

The channel estimation value storing unit 204 stores the selection result, as well as the estimated channel value of the selected signal. The signal generator 202 outputs the signal point corresponding to the channel estimation result of the selected signal to the coefficient-variable filter 203. Since the maximum likelihood sequence estimator 22 implements maximum likelihood estimation for the signal sequence using the state transition diagram, the signal output operation delays by a few symbols. For this reason, the coefficient-variable filter 203 determines the filter coefficient using a past channel estimation value tracing back by a delay time generated at the maximum likelihood sequence estimator 22, and adds the level fluctuation, the phase rotation, and the delay component to the signal point supplied from the signal generator 202. In this manner, a replica of the past signal can be generated using the estimation result of the maximum likelihood sequence estimator 22. Then, the sampled input signal (received signal) is delayed by the delay circuit 205 by a delay time generated at the maximum likelihood sequence estimator 22. The replica signal generated from the delayed received signal is subtracted from the delayed received signal at the subtractor 206. Thus, the remaining signal is obtained by removing the selected signal from the received signal.

With the signal separator 3 of the third embodiment, a signal estimated by the maximum likelihood sequence estimator 22 at low estimation error is used as a selected signal, and a replica of the selected signal is generated at high accuracy, while reducing the estimation error in the non-selected signal represented by the subtraction result.

The arrangement of the third embodiment is advantageous in the circumstances where the estimation result of one signal includes a lot of errors, while the other estimated signals include less error, among the multiple signals. Even under such a situation, a high-quality signal (with a high power level) with less error is selected from the received signal, and the replica of the selected signal is subtracted from the received signal to extract the signal waveform of the low-power signal containing errors. Consequently, bit error rate can be reduced as a whole.

Figure 17:
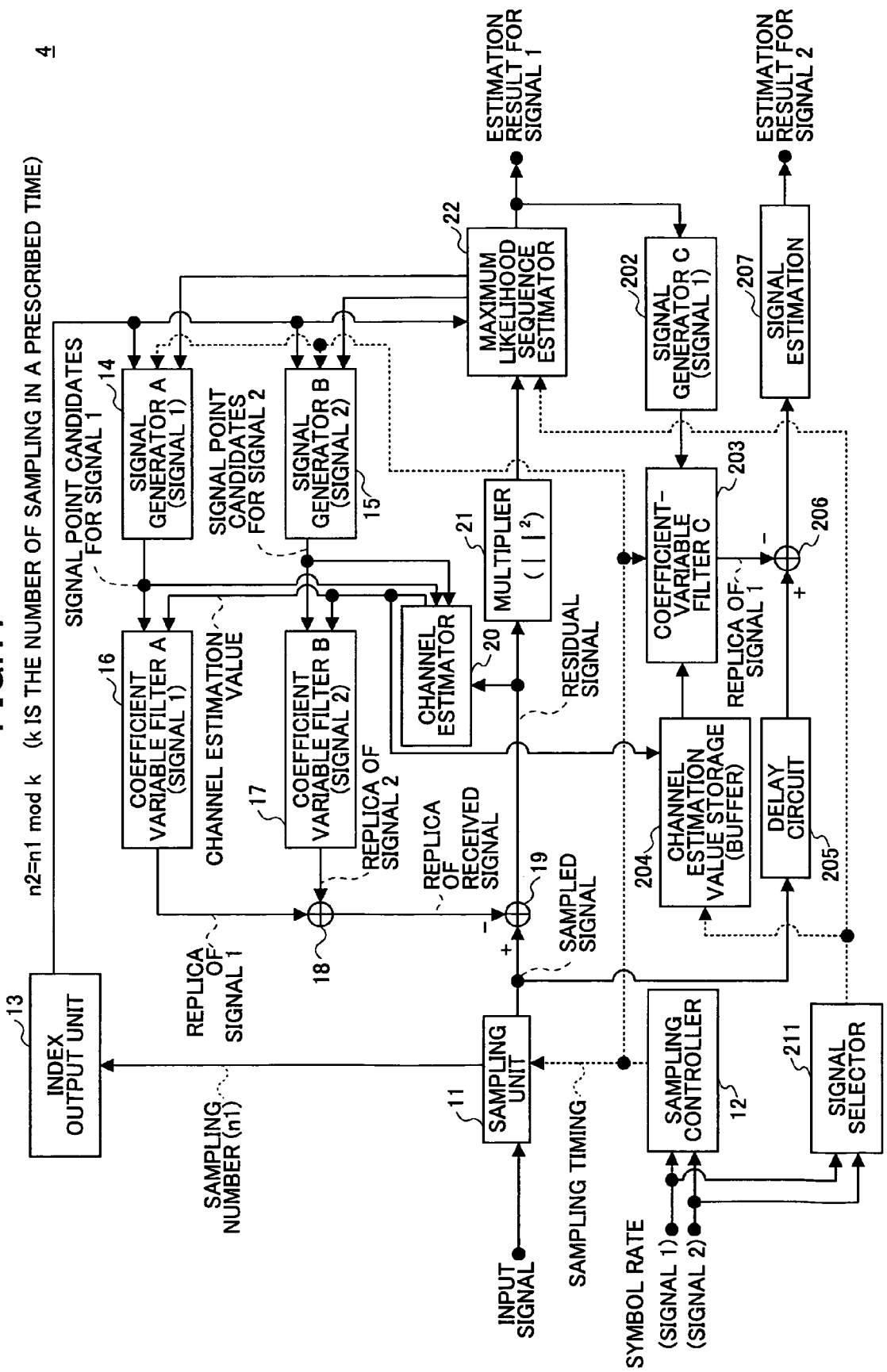
FIG. 17 is a block diagram of a signal separator according to the fourth embodiment of the invention.

FIG. 17 is a block diagram of a signal separator 4 according to the fourth embodiment of the invention. In the signal separator 4, the signal selection is performed based on the symbol rates of the signals, and the other functions and structures are the same as those of the signal separator 3 of the third embodiment. Accordingly, explanation is made only of the different portion, that is, the operation of the signal selector. The same components as those in the third embodiment are denoted by the same reference numbers.

In FIG. 17, upon receiving symbol rate information, the signal selector 211 selects a signal with a low symbol rate. Since a low-symbol-rate signal, which is likely to lead to a low estimation error at the maximum likelihood sequence estimator 22, is selected, the errors can be reduced as the entirety of the multiple signals.

As in the third embodiment, to separate multiple signals in the received signal from each other, a replica of the selected signal with a low estimation error is generated, and the replica is subtracted from the received signal. The remaining signals are estimated using the subtraction result, and consequently, estimation error can be reduced as a whole.

FIG. 18 is a block diagram of a signal separator 5 according to the fifth embodiment of the invention. The signal separator 5 has a weighting factor controller 220, in addition to the components of signal separator 1 of the first embodiment.

The components that perform the same operations as those shown in the first embodiment are denoted by the same reference numbers. Explanation is made only of the difference from the first embodiment to avoid overlapped description.

Although the signal separator 5 makes use of the basic structure of signal separator 1, the weighting factor controller 220 of the fifth embodiment may be applied to any of signal separators 2, 3, and 4 of the second through fourth embodiments.

In FIG. 18, if a lot of replica signal points exist in the signal space, located close to each other, the maximum likelihood sequence estimator 22 is likely to produce signal estimation error. In contrast, if the number of replica signal points in the signal space is small, with sufficient separation from each other, then the maximum likelihood sequence estimator 22 can perform signal estimation at high accuracy.

If the signal point constellation shown in FIG. 9B is obtained in the signal separators of the first through fourth embodiments, generating a replica using the signal points at t=0 causes less estimation error because of sufficient separation between signal points, and the estimation result is more reliable, as compared with using the signal points at t=T/3 or t=−T/3. When using the signal points at t=T/3 or t=−T/3, with insufficient separation between them, the estimation reliability becomes low. Taking these conditions into account, a weighting factor is designated by the weighting factor controller 220 and applied to the residual signal at the multiplier 221, before the residual signal is input to the maximum likelihood sequence estimator 22, so as to increase the influence of the residual signal at t=0 on the maximum likelihood sequence estimation, while reducing the influence of the residual signal at t=T/3 or t=−T/3. This arrangement can improve the signal estimation accuracy at the maximum likelihood sequence estimator 22.

The channel estimator 20 supplies the channel estimation value to the weighting factor controller 220. If the signal point separation calculated from the estimated channel value is small, the weighting factor controller 220 adjusts the weighting factor to be smaller. If the signal point separation is large, the weighting factor is set greater. As an actual example of the weighting factor determination method, a weighing factor given to the minimum separation between the replica signal points is determined in advance, and that weighting factor is stored in the database in association with the minimum separation. The weighting factor controller 220 uses the database as a reference when determining a weighting factor corresponding to a signal point separation. This arrangement can achieve accurate separation of multiple signals.

With the signal separator 5 of the fifth embodiment, when degradation of estimation accuracy is expected at the maximum likelihood sequence estimator 22 due to the existence of many signal point candidates for the replica signal at close vicinity, the weighting factor applied to the residual signal is made smaller to reduce the contribution to the signal estimation. In contrast, if accurate estimation is expected because of fewer signal point candidates of the replica signal with sufficient separation between them, the weighting factor applied to the residual signal is increased to enhance the contribution to the signal estimation. In this manner, the received signal sequence can be estimated accurately.

Although in the above-described embodiments the signal separator is assembled in a wireless receiver, it may be used independently.

This patent application is based on and claims the benefit of the earlier filing dates of Japanese Patent Application Nos. 2004-027279 and 2004-136663, filed Feb. 3, 2004 and Apr. 30, 2004, respectively, the entire contents of which are hereby incorporated by reference.

What is claimed is:

1. A signal separator for separating multiple signals contained in a received signal from each other based on a replica of the received signal, comprising:
   a sampling unit configured to sample the received signal at a prescribed sampling timing and output a sampled signal;
   an index output unit configured to monitor sampling counts of the sampling unit and output an index signal representing a remainder of a division dividing the sampling counts by a sampling number per a prescribed time period to group sampled signals;
   a first coefficient-variable filter configured to generate and output the replica of the received signal based on a channel estimation value and a signal point candidate, at least one of the channel estimation value and the signal point candidate being generated according to the index signal;
   a first subtractor configured to subtract the replica of the received signal from the sampled signal and output a subtraction result as a residual signal; and
   a maximum likelihood sequence estimator configured to estimate a sequence for each of the multiple signals based on the residual signal, taking into account signal state transition, and output an estimation result at a signal output timing determined by the index signal.

2. The signal separator of claim 1, further comprising:
   a channel estimator configured to estimate level fluctuation and phase rotation for each of the multiple signals in the received signal to produce the channel estimation value; and
   a signal generator provided for each of the multiple signals and configured to output the signal point candidate of associated multiple signals in a signal space, corresponding to a value of the index signal.

3. The signal separator of claim 1, further comprising:
   a channel estimator configured to estimate level fluctuation and phase rotation for each of the multiple signals in the received signal to produce the channel estimation value according to a value of the index signal; and
   a signal generator provided for each of the multiple signals and configured to output the signal point candidate of associated multiple signals in a signal space.

4. The signal separator of claim 1, further comprising:
   a signal selector configured to select one of the multiple signals;
   a storage configured to store the channel estimation value of the selected signal for a prescribed time;
   a signal generator provided for one of the selected signals and configured to output another signal point candidate corresponding to the estimation result of the selected signal supplied from the maximum likelihood sequence estimator;
   a second coefficient-variable filter configured to set a filter coefficient with reference to the stored channel estimation value, and output a replica of one of the selected signals using the another signal point candidate of the selected signal supplied from the signal generator;
   a delay unit configured to delay the sampled signal for said prescribed sampling timing; and
   a second subtractor configured to subtract the replica of one of the selected signals from the delayed signal.

5. The signal separator of claim 4, wherein the signal selector selects a signal with a high reception quality among the multiple signals.

6. The signal separator of claim 4, wherein the signal selector selects a signal with a low symbol rate among the multiple signals.

7. The signal separator of claim 1, further comprising:
   a signal generator configured to create a signal waveform not having been influenced by noise or fading for each of symbol sequence candidates of the received signal, and sample the signal waveform at said prescribed sampling timing to output the signal point candidate for each of the multiple signals in a signal space.

8. The signal separator of claim 1, further comprising:
   a multiplier configured to multiply the residual signal by itself and supply the multiplication result to the maximum likelihood sequence estimator.

9. The signal separator of claim 8, further comprising:
   a weighting factor controller configured to set a weighting factor according to each value of the index signal, and apply the weighting factor to the multiplication result before the multiplication result is input to the maximum likelihood sequence estimator.

10. The signal separator of claim 1, further comprising:
    a sampling timing controller configured to determine said prescribed sampling timing so as to cause the sampling unit to sample the received signal in accordance with symbol rates of the multiple signals and output the sampled signal in time series.

11. The signal separator of claim 1, further comprising:
a sampling timing controller configured to determine said prescribed sampling timing so as to cause the sampling unit to sample the received signal in accordance with a common multiple of symbol rates of the multiple signals.

12. The signal separator of claim 1, wherein the coefficient-variable filter has a plurality of input taps for an associated signal arriving with a time-spread delay wave, and outputs the replica of the associated signal including the time-spread delay wave.

13. The signal separator of claim 1, further comprising:
a signal generator configured to output a current signal point candidate for each of the multiple signals, taking into account at least one symbol of the past or the future along a time axis.

14. The signal separator of claim 13, wherein the maximum likelihood sequence estimator is configured to consider at least one symbol of the past or the future as a signal state when estimating a sequence based on the signal state transition.

* * * * *